United States Patent [19]

Kaneda et al.

[11] Patent Number: 5,005,956
[45] Date of Patent: Apr. 9, 1991

[54] LENS POSITION CONTROL DEVICE

[75] Inventors: Naoya Kaneda; Hiroyuki Wada; Masahide Hirasawa; Hirofumi Suda, all of Kanagawa, Japan

[73] Assignee: Canon Kabushiki Kaisha, Tokyo, Japan

[21] Appl. No.: 359,730

[22] Filed: May 31, 1989

[30] Foreign Application Priority Data

Jun. 1, 1988 [JP] Japan .................................. 63-135902
Jun. 7, 1988 [JP] Japan .................................. 63-139619
Dec. 26, 1988 [JP] Japan .................................. 63-328465

[51] Int. Cl.⁵ .............................................. G02B 15/00
[52] U.S. Cl. .................................. 350/429; 354/402; 358/227
[58] Field of Search ............... 350/429, 430, 255; 354/400, 402, 403, 404, 408; 358/225, 227

[56] References Cited

U.S. PATENT DOCUMENTS 4,697,891 10/1987 Kawai ................................. 350/429
4,749,268  6/1988 Moskovich et al. ............... 350/429

Primary Examiner—Bruce Y. Arnold
Assistant Examiner—Loha Ben
Attorney, Agent, or Firm—Fitzpatrick, Cella, Harper & Scinto

[57] ABSTRACT

A position control device for a lens system having a variator and a compensator the latter of which also serves as the focusing lens, includes apparatus for detecting the positions of the variator and compensator, circuitry for detecting the focus state, and a processor for controlling movement of the compensator in accordance with at least the outputs of the position detecting apparatus and the focus detecting circuitry, wherein the second lens group is moved in a predetermined direction such that the image is forcibly slightly blurred.

14 Claims, 21 Drawing Sheets

WIDE-ANGLE ←──────────────────────────→ TELEPHOTO

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| A | 1 | 1 | 1 | 1 | 1 | 1 | 1 | 1 | 0 | 0  | 0  | 0  | 0  | 0  | 0  | 0  |
| B | 0 | 0 | 0 | 0 | 1 | 1 | 1 | 1 | 1 | 1  | 1  | 1  | 0  | 0  | 0  | 0  |
| C | 0 | 0 | 1 | 1 | 1 | 1 | 0 | 0 | 0 | 1  | 1  | 1  | 1  | 0  | 0  | 0  |
| D | 0 | 1 | 1 | 0 | 0 | 1 | 1 | 0 | 0 | 1  | 1  | 0  | 0  | 1  | 1  | 0  |

POSITION OF RR LENS GROUP
FOR FOCUS ADJUSTMENT

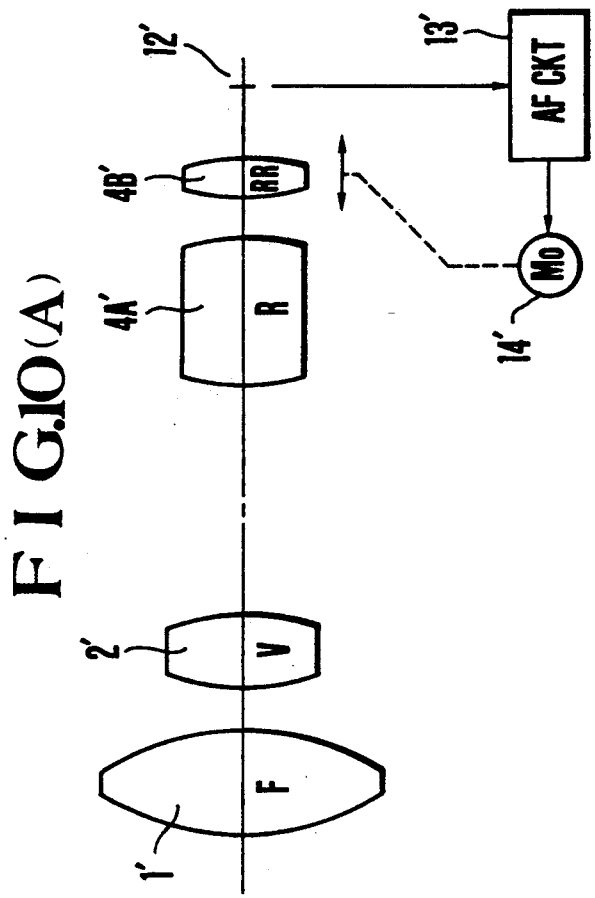

LENS POSITION CONTROL DEVICE

BACKGROUND OF THE INVENTION

1. Field of the Invention

This invention relates to control devices for movable lenses and, more particularly, to control devices for zoom lenses.

2. Description of the Related Art

Zoom lenses having the focusing function and the function of compensating for the image shift during zooming performed by one and the same lens group (or compensator) have been proposed, for example, in Japanese Patent Publication No. Sho 52-15226 or Japanese Patent Publication No. Sho 56-47533. In such a zoom lens, unlike the zoom lens of the type in which the above-described two functions are performed by respective individual lens groups, it becomes possible to minimize the size of the lens system and to shorten the minimum object distance.

In the above Japanese Patent Publication No. Sho 52-15226, based on the position information of the variator lens group, a position to which the compensator lens group has to move is determined by a computing process.

In the above Japanese Patent Publication No. Sho 56-47533, on the other hand, the amount of defocusing resulting from the change of the image magnification is sensed by the automatic focus detector to determine the adjustment of the compensator lens group.

By the way, the inventions of the above-mentioned publications would have no problem if the aforesaid computing process were done in real time. But, practically it takes a good deal of time. Therefore, particularly when zooming, immediate response of the compensator to the actuation of the variator cannot be permitted to occur, thereby making it difficult to sustain the in-focus state.

On this account, Japanese Laid-Open Patent application No. Sho 62-296110 discloses a technique of compensating for this response delay of the automatic focus detector. According to that document, a plurality of zones defined by the positional relationship of the variator lens and the compensator lens are set, and a unit movement amount of the compensator lens for every one of these zones corresponding to a predetermined movement amount of the variator lens is memorized. Then, on the basis of position information of the variator lens and the compensator lens at the time when a predetermined movement of the variator lens has been detected, a unit movement amount of the compensator lens is obtained according to the zone to be set by this position information. Further, on the basis of the direction of zooming and the information of the blur detected by the automatic focus adjusting device, the above-described unit movement amount is corrected. According to this corrected movement amount, the above-described compensator lens is moved. Thus, the compensation is effected.

However, in the above-described Japanese Laid-Open Patent application No. Sho 62-296110, although in a case where whether the blurring of the image in the middle of the course of movement of the variator lens group by the predetermined movement amount, that is, at a time during zooming, is in near focus or in far focus is ascertained, and a relatively smooth approach to the in-focus state can be expected, it is in the case of a photographic situation where a long time is necessary to discriminate between the near focus and the far focus that a sufficient performance becomes difficult to achieve. Particularly when zooming from the wide-angle side to the telephoto side, the probability of occurrence of blurring from an intermediate time during zooming owing to the relation with the depth of field is considered to be, in principle, very frequent.

Meanwhile, FIG. 10(A) is a schematic view illustrating the lens position control method for the inner focus type zoom lens and an example of lens arrangement. 1' is a first lens group; 2' is a second lens group; 4A' is a front lens of a relay lens group; 4B' is a rear lens of the relay lens group; 12' is an image detecting means at a focal plane; 13' is a focusing control (AF) circuit for detecting the in-focus state and controlling focusing; and 14' is a drive means controlled by the AF circuit 13' to carry out the position determination and driving of the rear relay lens 4B'

FIG. 10(B) to FIG. 10(D) show an example of the automatic focus adjusting device. In FIG. 10(B), a whole picture plane 17' of a video camera contains an area 18' from which a signal is taken out to measure the object distance. An actual object to be photographed is assumed to have a contrast 19'. In FIG. 10(C), part (a) represents this contrast portion. Then, part (b) is a Y signal output, part (c) represents the differentiated value of the Y signal, (d) is its absolute value, and part (e) is a signal after a peak hold has been applied, where the height A indicates the degree of focus (hereinafter called the "blur evaluation value"). FIG. 10(D) is a graph with the abscissa taken in the lens position and the ordinate taken in the blur evaluation value A, showing that the in-focus state is realized in the position B of the peak.

Another improved method is proposed in Japanese Laid-Open Patent application No. Sho 62-284316, in which depending on the position information of the variator lens and a lens which is used both for the compensation and the focusing function, or the position information of the variator lens and the distance adjusting member (distance ring), a unit movement amount of that lens which is used both for the compensation and the focusing function corresponding to a predetermined amount of movement of the variator lens is memorized. Each time the variator lens moves by the predetermined amount, unit movement amount memorized.

By the way, if, in the publicly known zoom lens and lens position control method shown in FIG. 10(A), the accuracy and speed of the input signal from the image detecting means 12' to the AF circuit 13' are high, there is no possibility for the image formed on the focal plane to blur or distort. In actual practice, however, by the response delay due to the cyclic distance measurement, etc., the possibility of lowering the accuracy of control of the rear relay lens 4B' is very high. Therefore, there is a serious problem that a large blurring is liable to occur.

Also, in the aforesaid improved method, it becomes a prerequisite to detect when the variator lens has moved by the predetermined amount. To obtain the high precision accuracy of movement of the aforesaid lens which is used both for the compensation and the focusing function, therefore, the amount of movement of the variator lens must be made much finer. Further, the moving speed of that lens must be made faster. Otherwise, it would take a considerably long time to correct the blurring produced.

A method of discriminating whether the lens having the focusing function is in the near focus position or in the far focus position by moving that lens in directions to the near focus position, and the far focus position and detecting the resultant change of the video signal, is known in, for example, Japanese Laid-Open Patent application No. Sho 55-76309, Japanese Laid-Open Patent application No. Sho 59-133783 and others.

SUMMARY OF THE INVENTION

One aspect of this invention is to provide a lens position control device applied to the inner focus type zoom lens wherein when zooming from the wide-angle side to the telephoto side, a lens group is moved in such a way as to produce a defocusing in a predetermined direction, thus making it possible to discriminate the direction of the defocusing.

BRIEF DESCRIPTION OF THE DRAWINGS

FIGS. 10(A), 10(B), 10(C) and 10(D) are diagrams for explaining the AF principle.

DETAILED DESCRIPTION OF THE PREFERRED EMBODIMENTS

The First Embodiment

Figure 1:
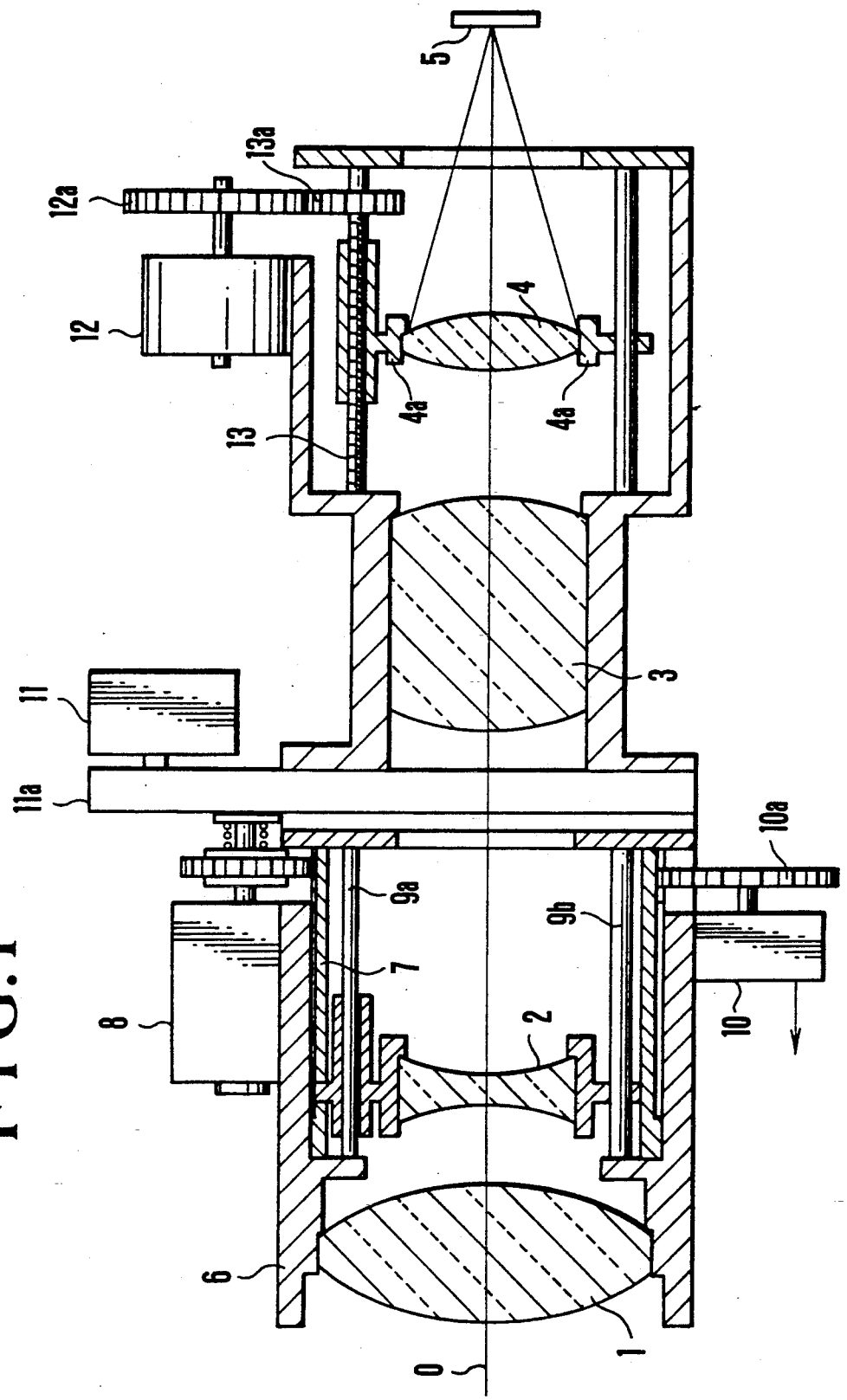
FIG. 1 is a longitudinal section view of a first embodiment of a zoom lens system according to the present invention.

FIG. 1 is a longitudinal section view of the first embodiment of the zoom lens according to the invention. Reference numerals 1, 2, 3 and 4 constitute a photographic optical system. Particularly, 2 is a variator lens group (hereinafter called the "V" lens group) which performs variation of the image magnification by moving along an optical axis, and 4 is a rear relay lens group (hereinafter called the "RR" lens group) having both of the focusing function and the function of compensating for the shift of an image plane resulting from the movement of the V lens group 2 and positioned closest to the image plane side. 5 is an image sensing member such as a CCD; 6 is a lens barrel; 7 is a cam sleeve having camming grooves and being rotated by a drive motor 8 to control and restrict the movement of the V lens group 2; 9a and 9b are guide bars for guiding the V lens group 2; 10 is an absolute encoder engaged with the cam sleeve 7 by a gear 10a to detect the rotated position of the cam sleeve 7, that is, the absolute position of the V lens group 2, producing outputs representing 16 zones of the zooming range.

Figure 2:
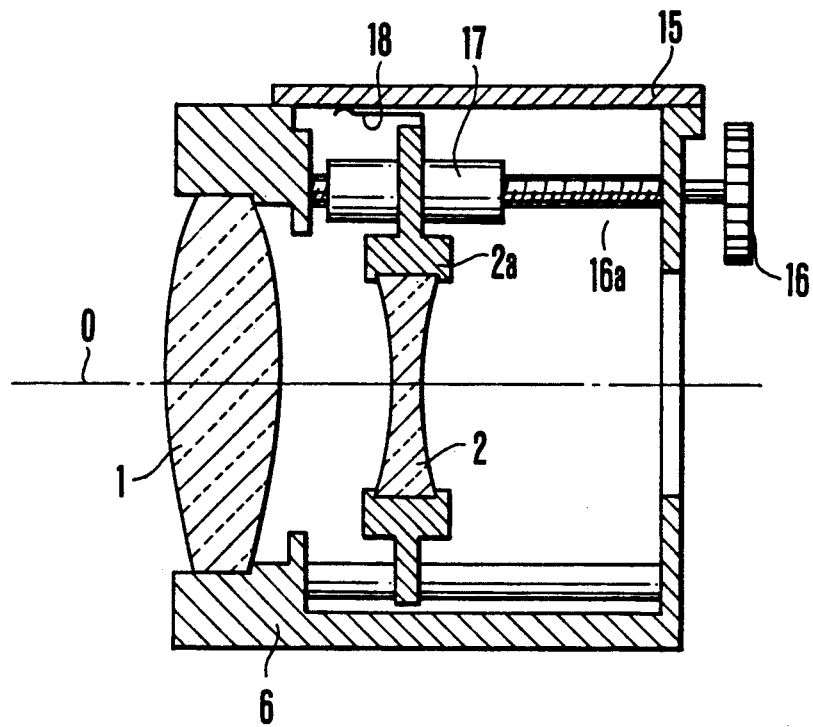
FIG. 2 is a sectional view for explaining a drive mechanism for the variator lens group.
Figure 3:
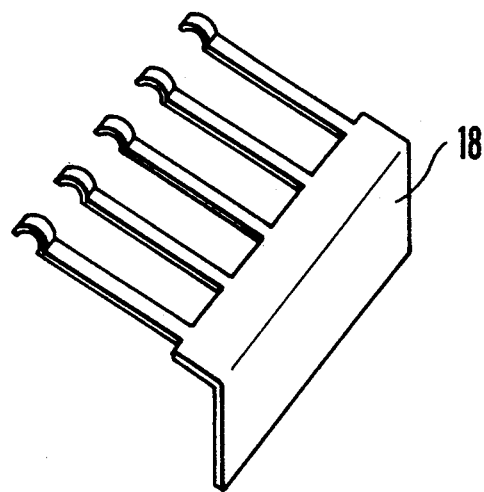
FIG. 3 is a perspective view of a brush for detecting the position of the variator lens group.
Figures 4, 5:
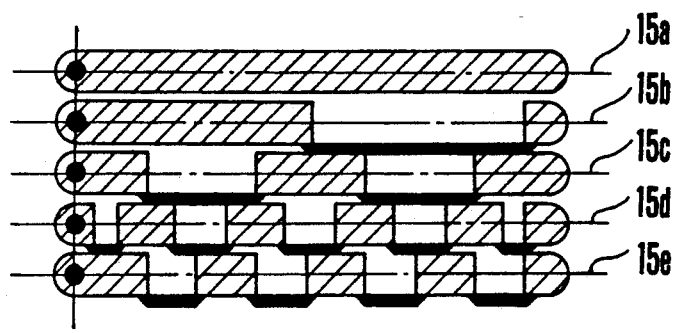
FIG. 4 is a plan view of the layout on the substrate for detecting the position of the variator lens group.
FIG. 5 is a table of the position signals of the variator lens group.

FIG. 2 is a view illustrating another practical example of detecting the absolute position of the V lens group 2. Incidentally, as to like reference numerals, the same functions are fulfilled. 16 is a gear for receiving the drive output of the drive motor 8. The gear 16 has its shaft formed with screw threads 16a and the shaft meshes with a moving member 17 formed in unison with a moving lens holding member 2a. A brush 18 shown in FIG. 3 is fixedly secured to the lens holding member 2a, while a Gray code board 15 having electrode patterns 15a to 15e shown in FIG. 4 is provided on the inner side of the lens barrel 6. When each brush terminal slides on the Gray code board 15, the absolute position of the V lens group 2 can be detected. In the present embodiment, the range of variation of the image magnification is divided into sixteen zones. Incidentally, a pattern 15a of the substrate electrode patterns represents a ground. Also, FIG. 5 shows the 16-divided code outputs.

Returning to FIG. 1, 11 is a diaphragm drive motor for operating a publicly known diaphragm mechanism 11a. 12 is a pulse motor for moving the RR lens group 4. 13 is a guide bar for guiding the RR lens group 4, having a screw-like groove formed therein and being rotated through a drive gear 12a of the pulse motor 12 to move the holding member 4a of the RR lens group 4 along the optical axis.

Figure 6A:
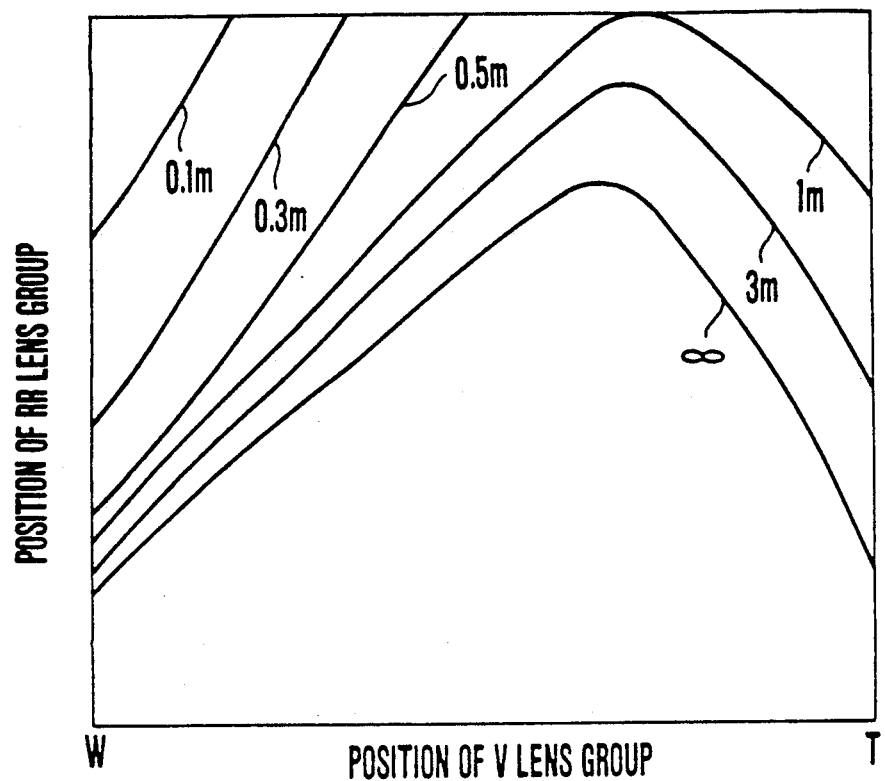
FIGS. 6(A) and 6(B) are graphs of object distance dependent curves of movement of the variator lens group and the rear relay lens group of the optical system according to the invention.

Now, in the optical system according to the invention (in other words, the lens system called "rear focus zoom" in which the focusing function and the compensating function are performed by one compensating lens group (RR lens group), as is different from the conventional common zoom lens system, that is, the lens system in which there are a focusing lens group and a compensator lens group so that the locus of movement of the compensator lens group can unequivocally be determined), the movement of the compensating lens group depicts different loci according to the various object distances. This condition is shown in FIG. 6(A). The position of the V lens group, that is, the focal length, is taken in the abscissa, and the position of the RR lens group is taken in the ordinate. Incidentally, W at the left end represents the wide-angle end, and T at the right end represents the telephoto end. As is understood from this figure, the locus of movement of the RR lens group varies depending on the object distance.

Figure 6B:
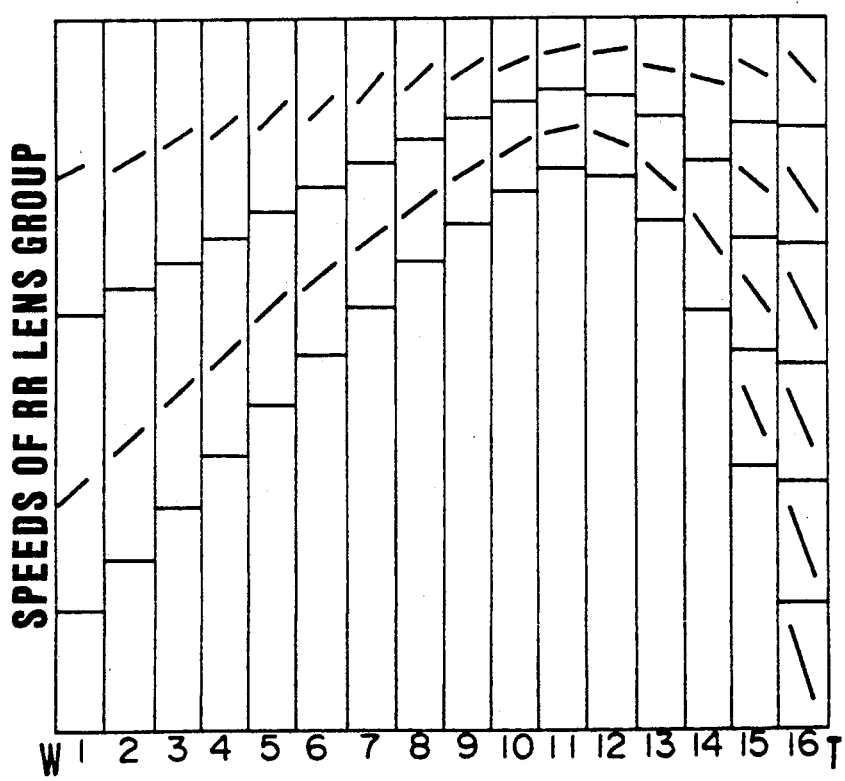

In a case where the automatic focus detecting device has actually been installed in the zoom lens having such a feature, because the automatic focus detecting device takes a good deal of time in processing, it becomes difficult to move the RR lens group 4 to follow up in real time fashion the continuous movement of the V lens group 2 during zooming while maintaining the in-focus state. Therefore, in the present embodiment, with such a problem in mind, according to the characteristic curves shown in FIG. 6(A), the total movement of the V lens group 2 is divided into a plurality of zones as shown in FIG. 6(B) and representative speeds of the RR lens group 4 are previously memorized for each zone. Incidentally, a premise is laid that when zooming, the moving speed of the V lens group 2 is constant. Also, in the present embodiment, these zones are sixteen in number, and the sixteen divided zones correspond to the sixteen divided zones of the above-described position detecting device for the V lens group 2. Therefore, if the in-focus state is preserved before the start of zooming, the moving speed of the RR lens group 4 is determined from the V lens group 2, the RR lens group 4 and the zooming direction. In principle, therefore, response delay of the automatic focus detecting device can be compensated for.

Figure 7:
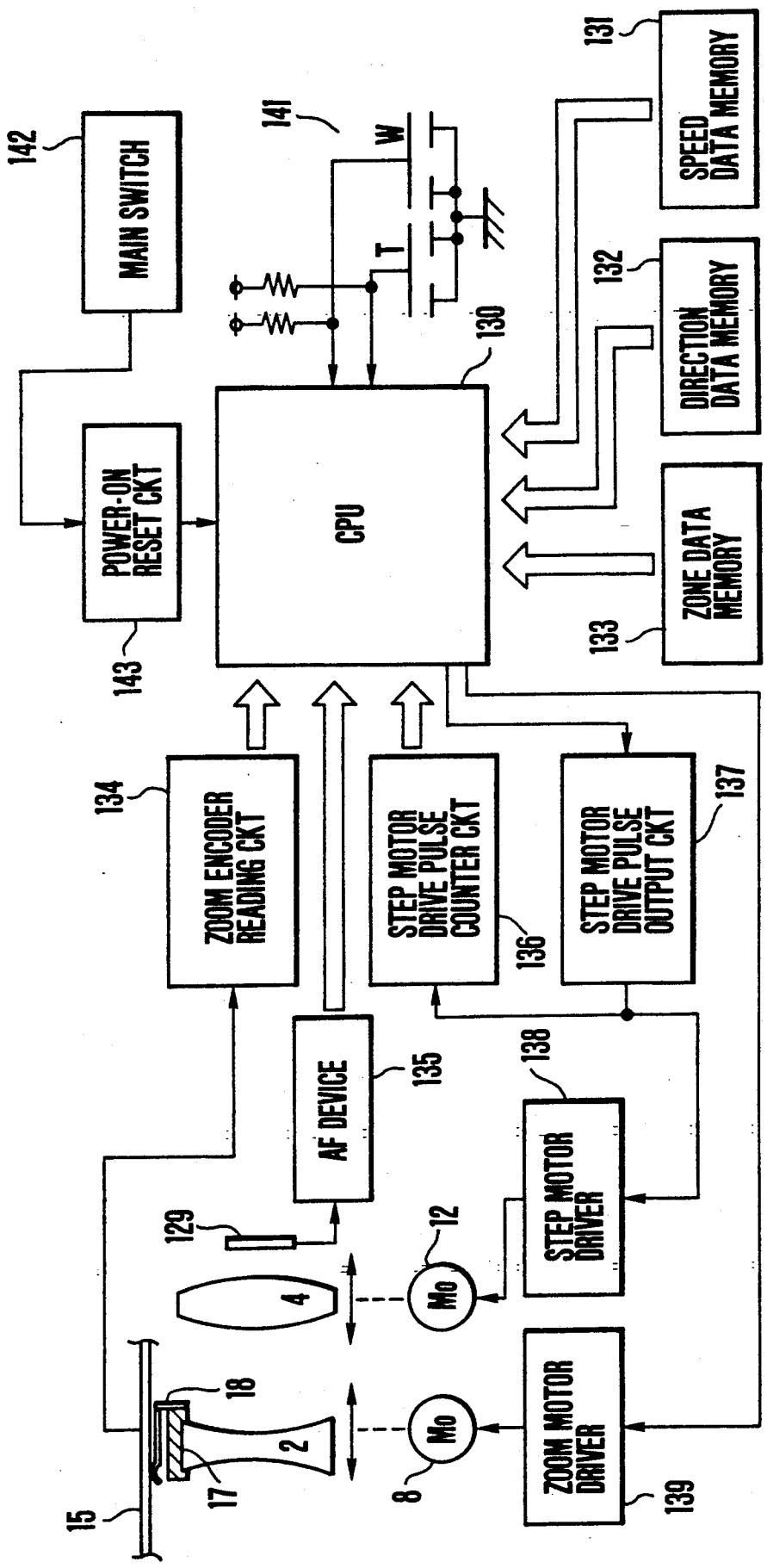
FIG. 7 is a block diagram illustrating the control of the invention.

FIG. 7 is a diagram of an electric circuit diagram to be combined with FIG. 1. When a main switch 142 is turned on, the step motor 12 is reset to a "0" address by a power-on reset circuit 143.

141 is a zoom actuation detecting portion. When a zoom switch (T, W) is manipulated, zooming information is transmitted to a CPU 130. In the CPU 130, the fact that the zoom switch (T, W) has been actuated becomes a trigger, so that the position of the V lens group 2 is sensed by the brush 18 and the substrate 15 and is transmitted by a zoom encoder reading circuit 134 to the CPU 130. Also, a step motor drive pulse counter circuit 136 counts the number of pulses the present position of the step motor 12 lies from the 0 reset position and it is transmitted to the CPU 130. These two items of position information are compared with numerical values in a zone data memory 133. From this comparison, a zone is determined. From a speed data memory 131, a speed representative of that zone is then read out. Further, depending on whether the actuation of the zoom switch (T, W) of the zoom actuation detecting portion 141 is in the direction from the wide-angle side to the telephoto side or in the direction from the telephoto side to the wide-angle side, the direction of rotation of the step motor 12 is read from a direction data memory 132 into the CPU 130. In the CPU 130, the direction of movement and the speed of the step motor 12 for driving the RR lens group 4 are determined from the contents read from these data memories and the blur information read in through an AF device 135 from an image sensor 129, and the drive direction of a motor 8 for driving the V lens group 2 is determined depending on the actuation result of the zoom switch (T, W). After that, an output to a step motor drive pulse output circuit 137 and an output to a zoom motor driver 139 are produced so that the two motors 12 and 8 move almost simultaneously.

Figure 8A:
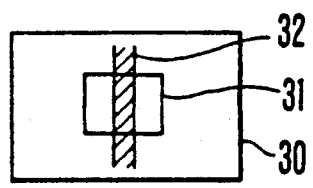
FIGS. 8(A), 8(B) and 8(C) are diagrams for explaining the principle of the focus detecting device according to the invention.
Figure 8B:
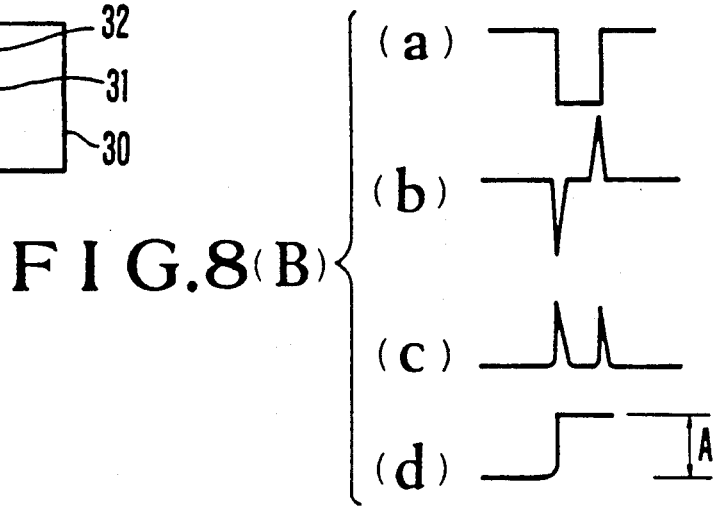
Figure 8C:
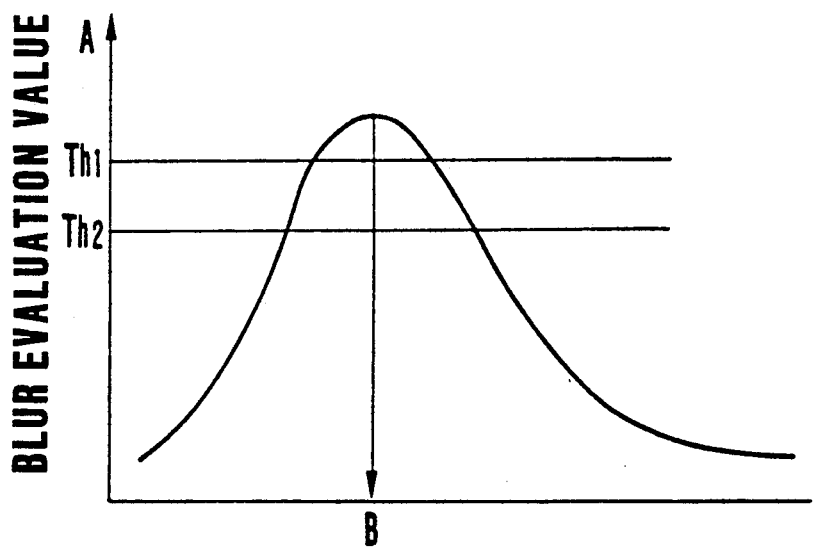

Next, an automatic focus detecting method suited to the lens position control device according to the invention will be described on the basis of FIGS. 8(A), 8(B) and 8(C).

Reference numeral 30 indicates a whole picture plane of the video camera, and 31 represents a distance measuring area in it. The focus detecting method of the present embodiment is, in principle, to detect the contrast of the image. For example, by treating the output of a image having the contrast shown at 32, the blur amount is detected. Part (a) of FIG. 8(B) shows a video signal of the image 32, and part (b) shows its differentiation wave form. Part (c) shows a wave form obtained by converting the differentiation wave form to the absolute value, and part (d) shows a signal level (evaluation value) A obtained by integrating and holding the absolute value of the wave form. If the image 32 is sharp, a high signal level A is obtained. If it is not sharp, in other words, blurring, the signal level becomes a low value. Therefore, fundamentally, as shown in FIG. 8(C), by detecting the highest position of the signal level A, the position B of the RR lens group 4 which should occur in the in-focus state can be determined.

It is to be noted that in the present embodiment, the evaluation value A is compared with each of two threshold value levels $Th_1$ and $Th_2$. Thus, the extent of the blurring is divided into three parts.

Figure 9A:
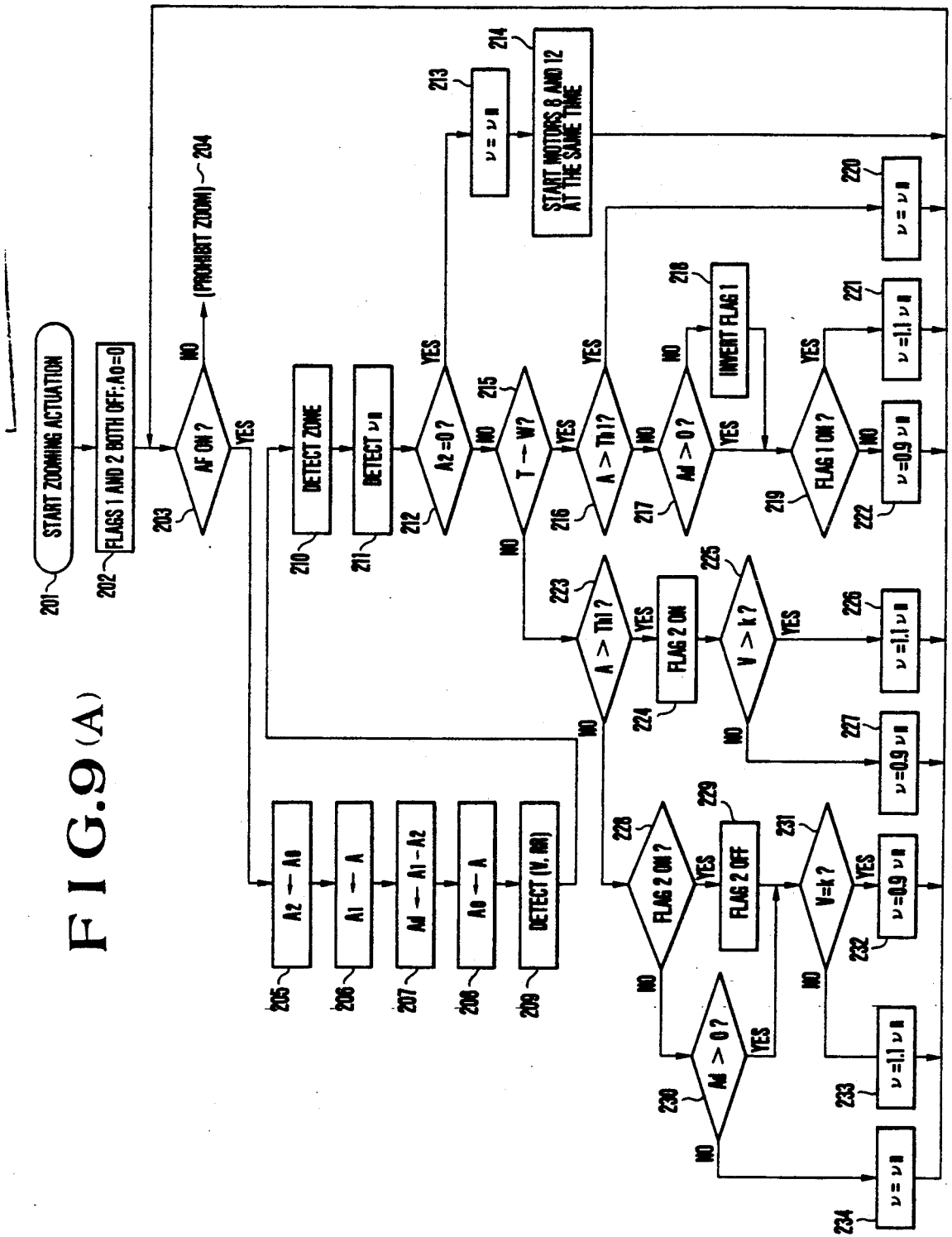
FIGS. 9(A) and 9(B) are flowcharts illustrating the control according to the invention.
Figure 9B:
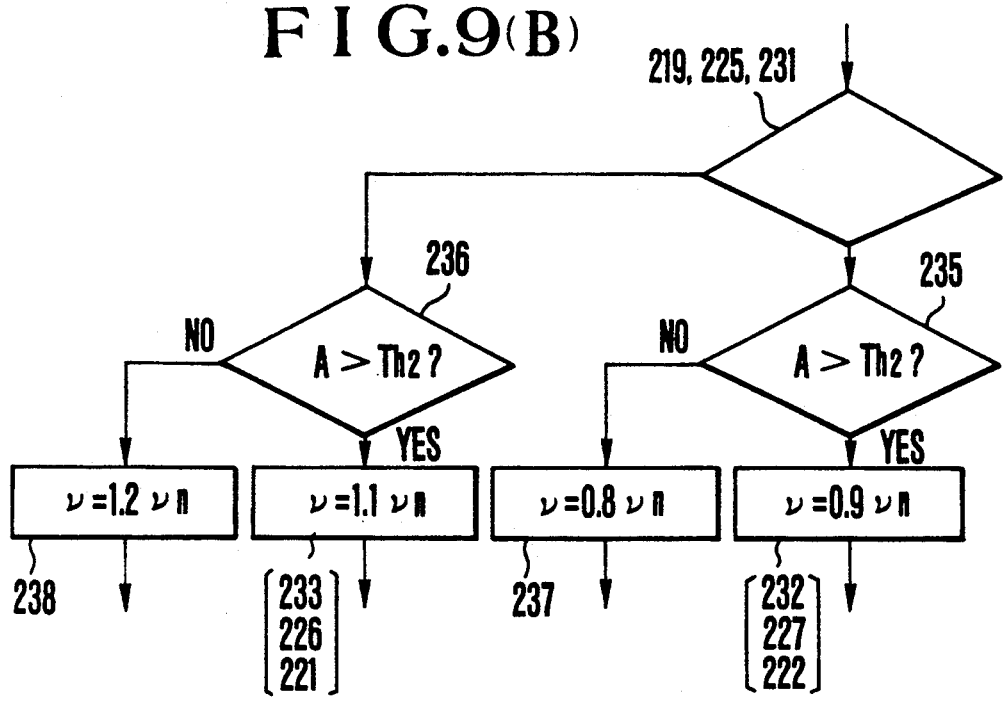

Next, the control according to the present embodiment is described o the basis of the flowchart shown in FIGS. 9(A) and 9(B).

In a step 201, when a zoom button or the like is actuated, a main routine starts to operate. The main routine repeats a step 203 and those that follow in, for example, 1/60 sec.

Also, when the actuation of the zoom button or the like is stopped, or the variator lens group position (V lens group position) reaches the terminal end of the range of movement, the main routine stops.

After the main routine begins with the step 201, flags 1 and 2 are turned off in a step 202 and a register $A_0$ is set to "0". In the next step 203, whether or not the AF device (automatic focus detecting device) is in operation is judged. When the AF operation is not operating, the magnification varying operation is prohibited in a step 204. Therefore, with the AF device not in operation, even when the zoom button is actuated, zooming cannot be carried out. If the AF device is in an operative position, a step 205 is executed so that the information in the register $A_2$ is transferred to, and stored in, a register $A_2$. Incidentally, at the first cycle, $A_2=0$. In a step 206, the evaluation value A of the blurring at the present time (concerning the value A, see FIGS. 8(A), 8(B) and 8(C)) is put into a register $A_1$. In a step 207, the value of "$A_1-A_2$" is put into a register Ad. In a step 208, the evaluation value A at the present time is put into the register $A_0$.

Then, from the position V of the V lens group 2 and the position RR of the RR lens group 4, a point (V, RR) in the map of FIG. 6(B) is detected in a step 209.

In a step 210, the zone to which the detected point (V, RR) by the step 209 belongs is detected. Then, the representative speed $vn$ of the detected zone is read from the memory therefor in a step 211.

Whether or not $A_2=0$ is valid is judged in a step 212. At the first cycle, $A_2=0$. In this case, as the moving speed of the RR lens group, $\nu = \nu n$ is specified in a step 213 and the motor 8 for moving the V lens group and the motor 12 for moving the RR lens group, both being shown in FIG. 7, are then started at the same time in a step 214. The speed of the motor 8 is set to a predetermined constant value. Subsequently, during the time until the main routine ends by the aforesaid condition, the motor 8 continues rotating at the constant speed and the motor 12 continues rotating at a speed $\nu$. It should be noted that the speed $\nu$ simultaneously includes information of the direction of rotation of the motor 12.

If, in the step 212, $A_2 \neq 0$, that is, at the second or later cycle, the flow proceeds to a step 215. In the step 215, the condition is differentiated according to the direction of zoom actuation. When zooming T→W (from the telephoto side to the wide-angle side), the evaluation value A is compared first with the allowance level $Th_1$ in a step 216. If $A > Th_1$, that is, if the image is determined to be in focus, the moving speed of the RR lens group is set to $\nu = \nu n$ in a step 220. If the image is determined to be out of focus ($A \leq Th_1$), on the other hand, the flow then proceeds to a step 217. In the step 217, whether a value of the register Ad is positive or negative is tested. If the value of the register Ad is positive, it implies that the blurring is improved in the time space intervening between the previous and present cycles (for example, the time space of 1/60 sec.) If the value of the register Ad is negative, it implies that the blurring is intensified. When the blur has expanded, the flag 1 is inverted in a step 218.

Assuming, for example, that zooming goes T→W, and the in-focus state is established at the start of zooming, then the first cycle sets $\nu = \nu n$ in the step 213, and the two motors start to rotate at the same time in the step 214. The second or later cycle, so long as the in-focus state is maintained, sets the moving speed of the RR lens to the zone dependent value, that is, $\nu = \nu n$ in the step 220. But, if the n-th cycle detects the out-of-focus state ($A \leq Th_1$) in the step 216, the flow proceeds to the step 217. Here, since the (n-l)st cycle detects the in-focus state and the n-th cycle detects the out-of-focus state, the value of the register Ad is negative. In a step 218, therefore, the flag 1 is inverted. By the way, whether the flag 1 is turned on or off carries the information of the preceding zooming operation. Accordingly, on the n-th cycle in which the out-of-focus state has occurred for the first time, it is considered that after the flow has passed the step 218, such a turning-on or -off of the flag 1 appears with a probability of 1:1.

Hence, suppose such an n-th cycle is occurring, then after the branching in a step 219, the selection of a step 222 for $\nu = 0.9 \nu n$ or the selection of a step 221 for $\nu = 1.1 \nu n$ occurs with a probability of 1:1. That is, when the image becomes out of focus for the first time, the speed is made to change from $\nu = \nu n$.

Differing from the above, the (n+1)st cycle operates in such a manner that when the flow reaches the step 217, whether or not the blurring has been improved in the time space from the n-th cycle to the (n+1)st cycle is detected in the step 217. As a result, if the blurring is intensified, the flag is inverted in the step 218 to set a different speed from that when in the n-th cycle. If it is improved, the speed is left unchanged from that of the n-th cycle.

In other words, after the out-of-focus state has once been detected in the n-th cycle, whether the blurring is corrected in between the n-th and (n+1)st cycles by accelerating the speed $\nu n$ or by decelerating it, is detected. The selection of the value of the speed $\nu$ in the step 221 or 222 of the (n+1)st cycle becomes the setting of the speed as corrected to the right direction after the detection.

Meanwhile, in the present embodiment, if in the step 215 the zooming direction is detected to be W→T (zooming from the wide-angle side to the telephoto side), the flow proceeds to a step 223. Steps 223 to 234 constitute a characteristic portion of the present embodiment.

The steps 224 to 227 show the flow in the in-focus state. If the image is determined in the step 223 to be in focus ($A > Th_1$), the flag 2 is turned on in the step 224. In the step 225, whether the detection result of the position V of the V lens group is nearer to the wide-angle side or to the telephoto side than the k-th zone is determined. For example, as shown in FIG. 6(B), the small positions V are assumed to be the wide-angle side, and the large ones to be the telephoto side, and k=11 is taken. Then, for the wide-angle side region of the zones 1 to 11, $\nu = 0.9 \nu n$ is set in the step 227, and for the telephoto side region of the zones 12 to 16, $\nu = 1.1 \nu n$ is set in the step 226. This represents the characteristic that as shown in FIG. 6(A) when W→T zooming is performed, the gradient in the wide-angle side region is upward to the right, and the gradient in the telephoto side region is downward to the right. That is, the differentiated value of the locus of FIG. 6(A) changes its sign at an intermediate focal length as the boundary. If, at the time of W→T, $\nu = 0.9 \nu n$ is set for the wide angle side region, the absolute value of the gradient in the locus of FIG. 6(A) becomes small. Thus, the far focus state is approached. Likewise, after the change of the sign of the differentiated value, $\nu = 1.1 \nu n$ is set for the telephoto side region. Even in this case, the far focus state is also approached.

It will be appreciated from the foregoing that the program in the steps 224 to 227 of FIG. 9(A) is so formed that when focusing is going on along with W→T zooming, the far focus state always takes place.

By the way, when the out-of-focus state has occurred in the step 223, whether or not the flag 2 is on is detected in a step 228. If the flag 2 is on, as it implies that the flow in the preceding cycle has passed through the step 224, the probability of blurring to the far focus state as the result of the speed setting by the step 226 or 227 is very high. In such a case, therefore, after the flag 2 is turned off in the step 229, the speed is set to a direction for correcting the far focus state in the steps 231-233.

That is, in the present embodiment, when T→W zooming is performed, the direction detection of the blurring correction is performed in between the n-th cycle and the (n+1)st cycle. After that, the optimum speed is determined. When W→T zooming is performed, on the other hand, because the direction of the blurring occurrence is determined, the direction of correction can readily be determined.

In actual practice, it is considered that due to the condition of the object and noise, a blurring amount Ad does not clearly appear in between the n-th cycle and the (n+1)st cycle. When T→W zooming is performed, even in such a case, from the above-described reason, blurring hardly occurs. But when W→T zooming is performed, it is liable to occur. Moreover, if the discrimination between the near focus and the far focus hesitates, the blurring continues expanding. For this reason, if the design is made so that the blurring becomes the far focus state, it results that the blurring can be stably eliminated.

The flow reaches the step 230 only when the steps 228 to 233 have once been passed, or when blurring occurs from the very start of zooming. When the flow has once passed the steps 228 to 233, the correction of the direction to improve the blurring is started in the step 232 or 233. Therefore, it can be expected that the judgment of the step 230 almost always falls in the case of "yes". Incidentally, when Ad<0 in the step 230, it often happens that an object which is difficult to detect with the AF device is being photographed. Therefore, $v=vn$ is set (step 234).

It should be noted that though in the present embodiment the rate of the correction to the zone representative speed $vn$ is made to be "0.9" or "1.1", these numerical values may be in other combinations than that.

FIG. 9(B) is another embodiment where a finer speed control is performed by adding the discrimination by one more threshold value before each of the speed selections of the steps 233, 232 and 227, 226 and 221, 222 of FIG. 9(A).

After the steps corresponding to the steps 219, 225 and 231 of FIG. 9(A), the evaluation value A of the blurring is compared with a second threshold value $Th_2$ in a step 235 or 236. Here, the threshold value $Th_2$, as shown in FIG. 8(C), is assumed to be in the relationship: $Th_2 < Th_1$. By this judgment, when the blurring is $A \leq Th_2$, the flow proceeds to a step 238 or 237. Thus, the speed $vn$ changes 20%.

Though, in the present embodiment, the movement of the RR lens group has been controlled so that the far focus state always occurs, it is needless to say that it may be moved so that the near focus state always occurs.

Further, though the present embodiment has been described in connection with the rearmost lens group used as the lens group for focusing and compensation, it is needless to say that the invention is applicable to any other examples of optical design.

As has been described above, according to the present embodiment, particularly when varying the focal length from the wide-angle side to the telephoto side, even for focusing purposes, the RR lens group is moved in a direction for producing always a predetermined defocusing. Therefore, the direction of the defocusing is known. This is very advantageous as compared with the conventional device which necessitates a complicated mechanism.

The Second Embodiment

Figure 11:
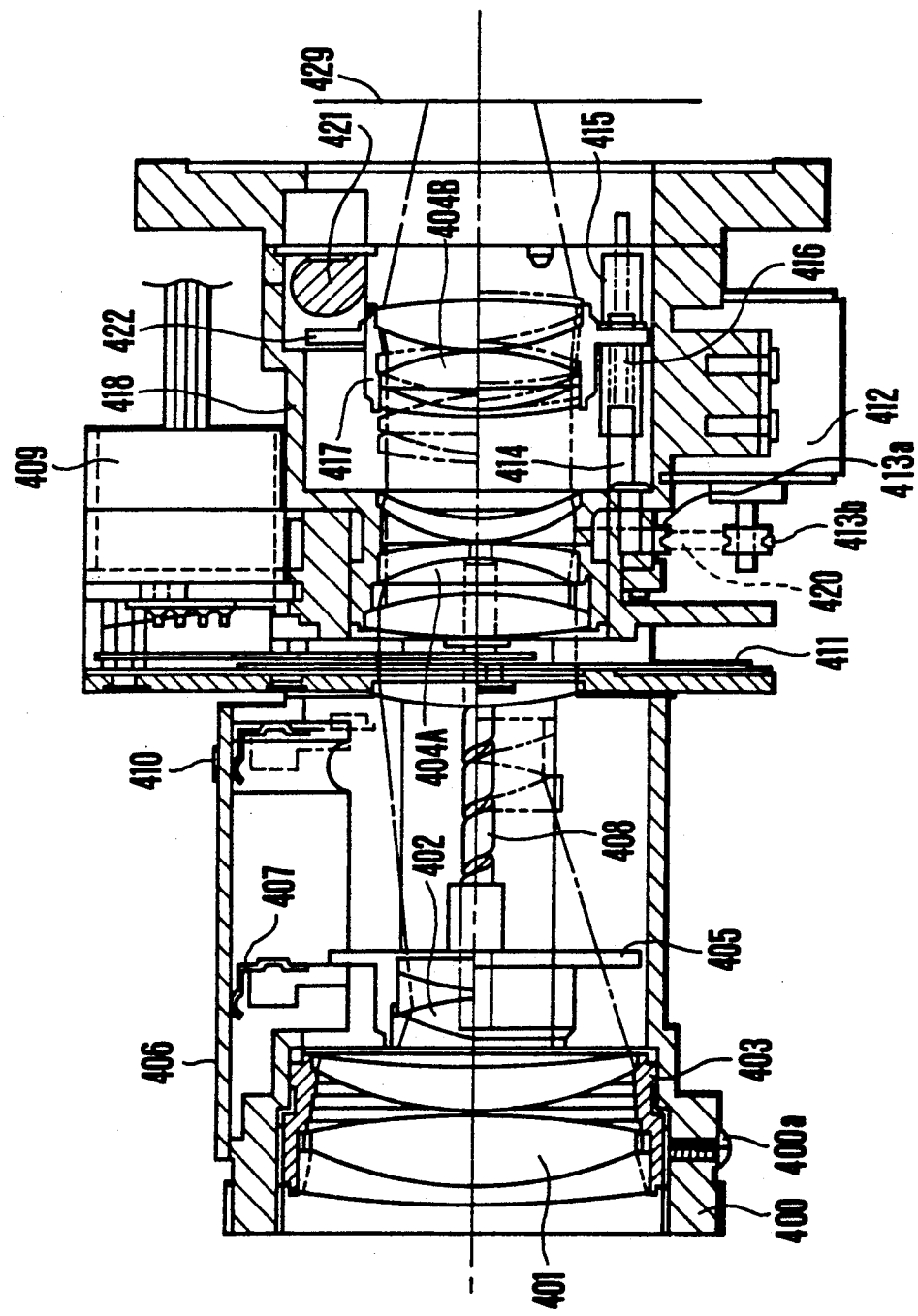
FIG. 11 is a longitudinal section view of a second embodiment of the zoom lens.

FIG. 11 is a longitudinal section view of a zoom lens barrel to which the lens position control device as the second embodiment of the invention is applied.

In the figure, 401, 402, 404A, 404B are individual lens groups. The first lens group 401 is fixed to a barrel frame 403 which is screw-threadedly fitted in a fixed barrel 400 so that the lens position becomes optimum and which is, after adjustment, fixedly secured thereto by a screw fastener 400a. The variator lens group 402 is fixed to a variator moving ring 405 which moves in the thrust directions (axial directions) as guided by a bar 408. Here, the bar 408 has a V groove machined in the outer periphery thereof with a certain lead as shown in the figure. A ball (not shown) is pressed against this V groove by a leaf spring (not shown) fixed to the variator moving ring 405 so that its position is determined. By rotating the bar 408 using the zoom motor 8 shown in FIG. 7, its position can be changed. (FIG. 7 is used in common even in the second embodiment.) Also, a brush 407 is mounted on this moving ring 405 and slides on an encoder substrate 406, thus constituting a variator encoder. An iG meter 409 drives diaphragm blades 411 to control the size of opening of the diaphragm aperture. The lens group 404A is fixed to the lens barrel 418.

Meanwhile, the lens (RR) group 404B is mounted to a movable ring 417. The movable ring 417 is provided in unison with an axially extending sleeve 415 having female screw threads machined in the inner side thereof. This sleeve 415 meshes with a drive shaft 414 having male threads machined in the outer periphery so that an axial movement is impossible but a rotation about the optical axis is possible. This drive shaft 414 has a drive shaft pulley 413a at one end thereof, to which a rotative driving force is transmitted through a V belt 420 between it and a pulley 413b of a step motor 412. That is, by rotating the step motor 412, the drive shaft 414 rotates to screw out or in the sleeve 415, so that the axial position of the lens group 404B can be changed.

Here, for example, the pitch of the screw thread of the sleeve 415 is 0.35 mm, the ratio of the drive pulley 413a to the pulley 413b is 2, and the angle of rotation of the step motor 412 per one pulse input is 18 degrees. Then when one pulse is inputted to the step motor 412, the lens group 404B axially moves 8.75 μm. If this amount of movement of the lens group 404B is factored to about 1.0 on an image sensor 429 at the focal plane, the deviation of the lens from the in-focus state by one pulse reflects to a confusion circle of about 10 μm in diameter. If the precision is on this order, a sufficient accuracy of focusing control can be obtained.

The present embodiment employs the number of inputted pulses to the step motor 412 to detect the position of the lens group 404B which has both of the functions of the compensator and the focusing lens. Because of this, when the electric power source of the camera is turned on or off, the lens group 404B must be moved to a predetermined "0" address. In the present embodiment, a rear end portion 422 of the movable ring 417 abuts on a 0-address adjusting cam 421 when the lens group 404B is set to the 0 address.

Figure 14:
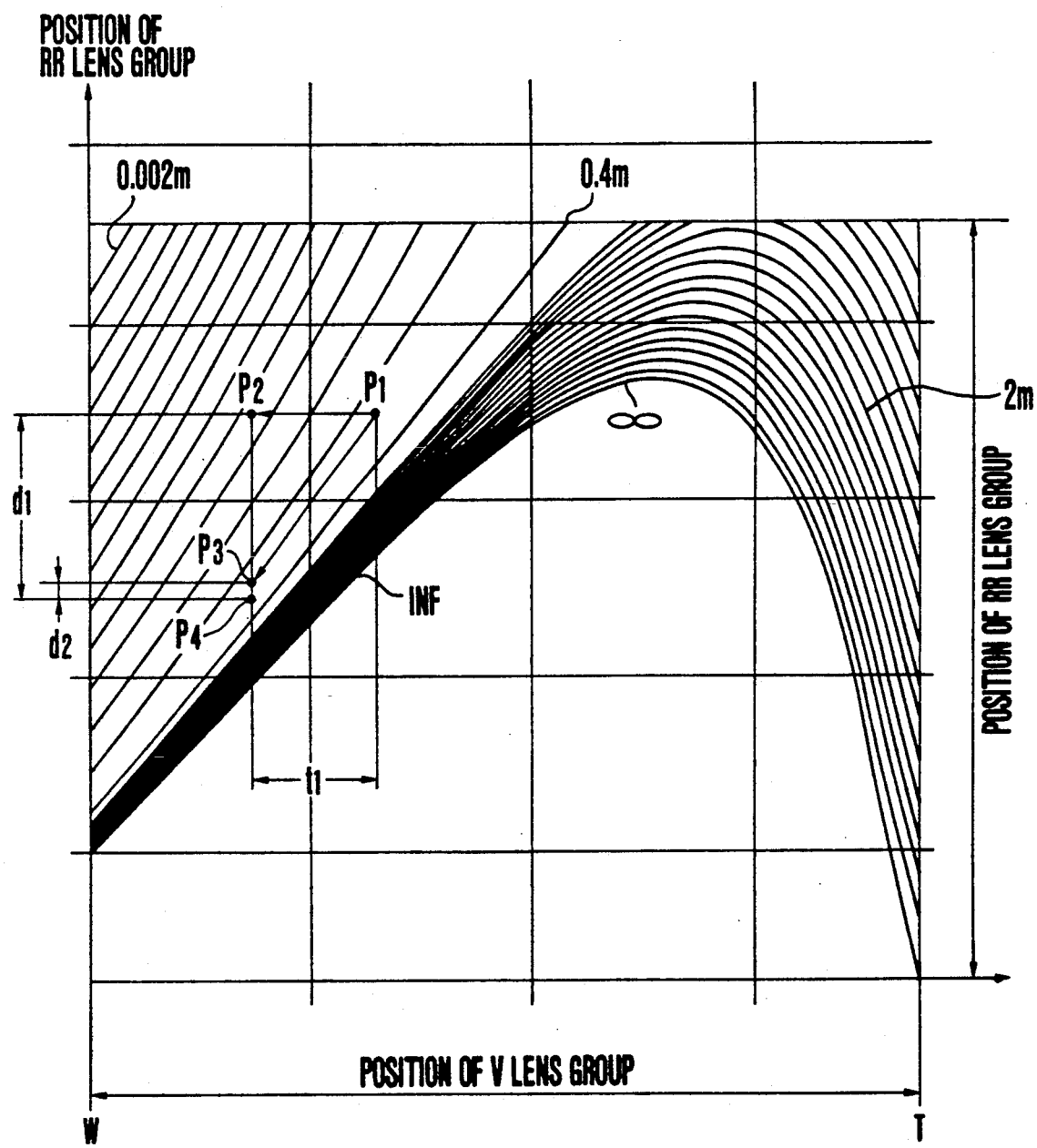
FIG. 14 is a map displaying the relative position relationship of the two movable lenses in the zoom lens as the optical instrument to which the invention is applied, and used for explaining the principle of the invention.

In the thus-arranged zoom lens system, the correlation between the position of the second lens group 402 (hereinafter referred to as "V") and the position of the rear relay lens group 404B (hereinafter referred to as "RR") is expressed depending on the object distance as shown in the graph of FIG. 14.

In FIG. 14, the detected point of the position of the RR and the position of the V by the respective position detecting means is assumed to be $P_1$, and the cycle of distance measurement in the focusing control means for controlling this zoom lens is assumed to be $t_1$. And, suppose the cycle of distance measurement is started at the same time that the V has been moved, then it is considered that the position relationship between the V and the RR changes to a point $P_2$ in the time space until the next distance measurement result is output.

Under a different condition that the RR is moved at the same time that the V moves, even if correction by the distance measurement is not performed, the relative positional relationship between the V and the RR becomes a value represented by, for example, a point $P_3$ As a result, the discrepancy from the ideal point $P_4$ becomes $d_2$. When the effectivity of the V at the focal lengths of the points $P_1$ to $P_4$ on the focal plane is expressed as 1.0, the diameter of the circle of confusion in terms of the F-number at this time denoted by F is zero for the point $P_4$. $d_2/F$ for the point $P_3$, or $d_1/F$ for the point $P_2$. Here suppose $d_1=5d_2$, the blurrings at the points $P_2$ and $P_4$ appear to be 5 times different in the circle of confusion from each other. This motion is found under the premise that the object distance remains unchanged. But, it has a great advantage in the improvement of the percentage of occurrence of blurrings during zooming.

However, in order to ideally realize this thought, it is required to accurately sense the positions of the V and the RR to determine the point $P_1$ and, then to correctly predict a characteristic curve passing through the point $P_1$, based on which the the required moving speed of the RR is computed. As a result, it leads to the necessity of a large scale of computing circuit. Thus, a problem arises that the cost of the focus control means becomes high.

Therefore, in the present embodiment, a method is employed wherein the map shown in FIG. 14 is divided into zones in both directions, that is, the V direction and the RR direction, to the necessary tolerances, and a representative speed for each of the zones is previously determined and stored in a speed data memory 131 to be more fully described later in FIG. 7.

Figure 15:
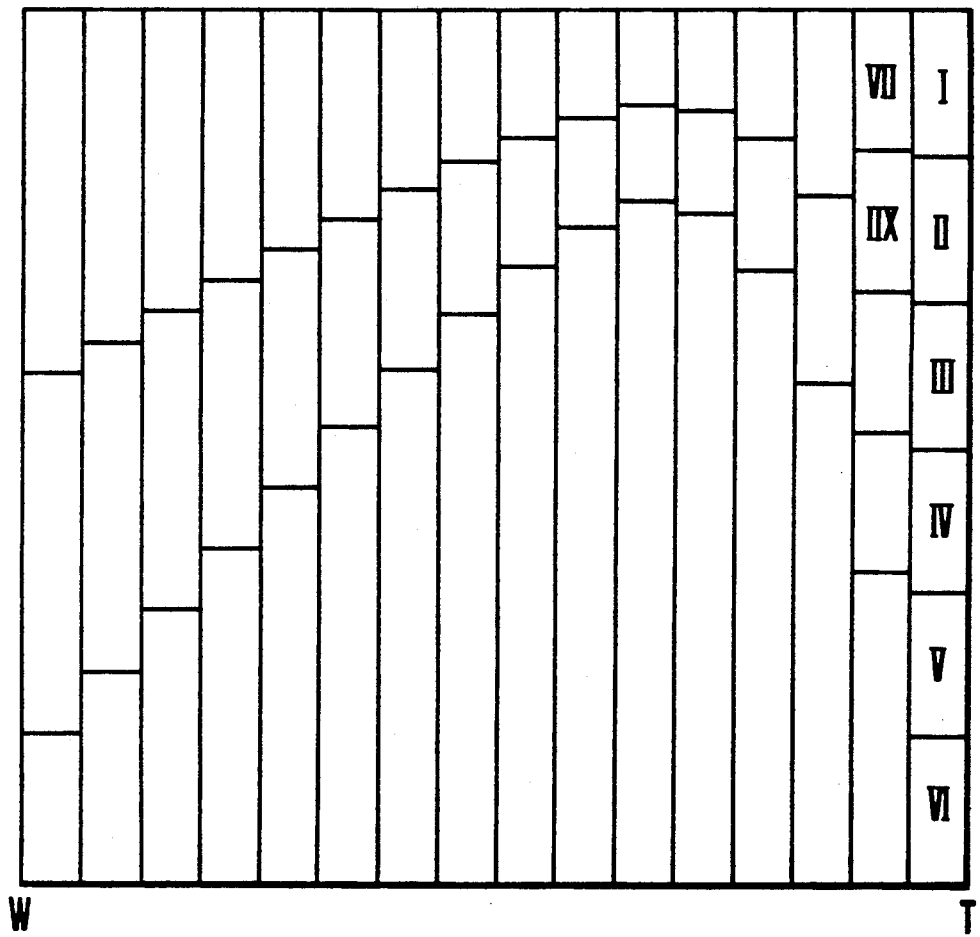
FIG. 15 is a diagram obtained by dividing the map of FIG. 14 according to the principle of the invention.

FIG. 15 is an example of division of the map of FIG. 14 into zones. In this example of division, while the total movement of the V is divided into equal zones, the total movement of the RR is divided by a number obtained b dividing the difference between the gradients at infinity and the minimum object distance of the loci passing through one of the zones of the V by the target depth of field.

Figure 16:
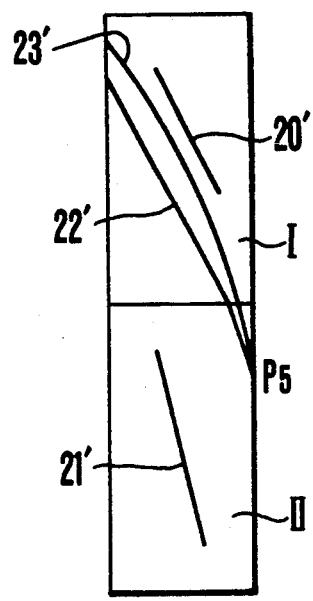
FIG. 16 is a diagram in enlarged scale of a portion of FIG. 15 for explaining the principle of the conventional control method.

FIG. 16 is a diagram for explaining the control method for determining the moving speed of the RR on the basis of the relative position curve of the V and RR within the zones I and II of FIG. 15.

In FIG. 16, a relative position curve 23' for the constant object distance passes through point $P_5$, and curves 20' and 21' represent the gradients of the lens movement in the respective zones (which incidentally, may be considered to be the moving speed of the RR when the moving speed of the variator is constant). In a case where, without the feedback from the AF, the V and RR move from the point $P_5$. they, so long as lying in the zone II, move in a locus passing the point $P_5$ in parallel to the curve 21' and, so long as lying in the zone I, move in parallel to the curve 20', the total real locus becoming as indicated at 22'. The discrepancy between the ideal locus 23' and the real locus 22' represents the error. However, in this case, the locus 22' brings about a state in which a focus is obtained at a longer distance than the actual object distance for the ideal locus 23', that is, the so-called far focus state. If the image is determined in one cycle of distance measurement to be out of focus, the RR is moved forward at a faster speed under the condition that the moving speed of the V is constant, in order that the RR approaches the ideal locus 23'.

By the way, the representative speed in the zone II gives, in this case, the far focus state. But, for some settings of the representative speed and some positions of the start of movement of the RR, the far focus state does not always result. Focusing may be effected to a shorter object distance than the actual one, or the so-called near focus state may result. In this case, the moving speed of the RR should be slowed down, so that the in-focus state can be approached.

For this reason, when out of focus, which of the near focus state or the far focus state is occurring must be determined. Otherwise, the speed of the RR could not properly be corrected by increasing or decreasing from the representative speed. Therefore, in the aforesaid speed control method of FIG. 16, if the out-of-focus state is detected in one cycle of distance measurement, the moving speed of the RR is, for example, increased. In the next cycle of distance measurement, whether or not the in-focus state has approached is tested. If the image is sharper, then the RR is moved at that corrected speed. If not, the moving speed is corrected by decreasing it. Thus, the trial-and-error method is employed.

However, the discrimination between the near focus state and the far focus state by trying to use a corrected speed by increasing or decreasing it has no time loss provided that after the RR has once been moved at that corrected speed, the correction is found to be right. But if wrong, the speed must be altered again. This leads to a time loss. During this time, zooming goes with blurring of the image. Moreover, a program for discriminating between the near focus state and the far focus state becomes necessary. Thus, the number of circuits is increased, which in turn causes the bulk and size of the device to increase.

Figure 12:
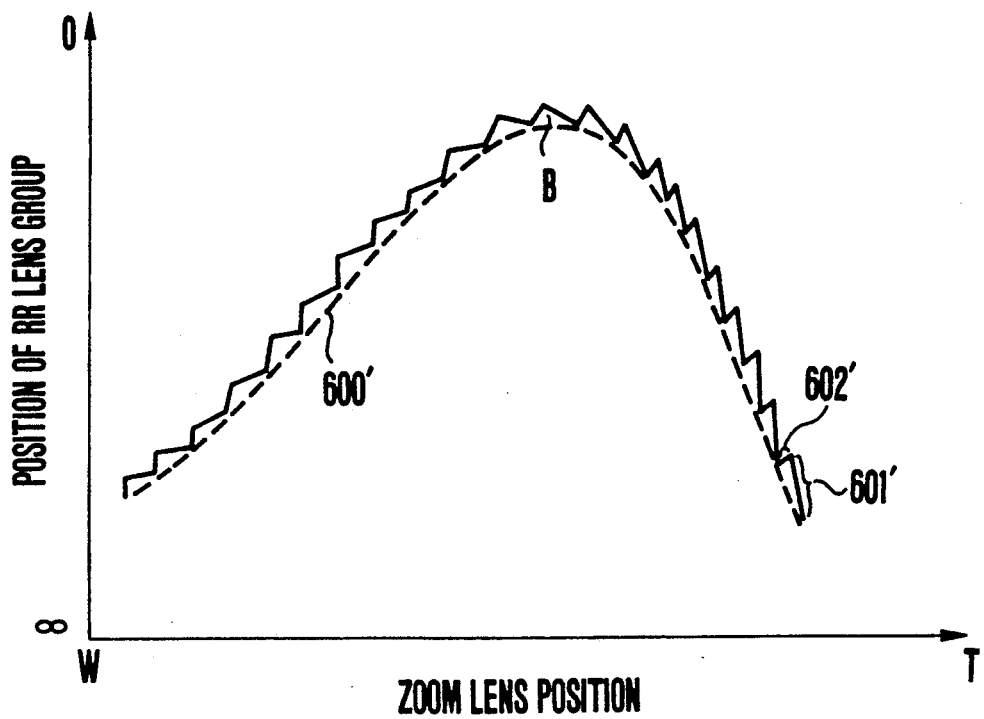
FIG. 12 is a graph showing the working zones of the two movable lenses of the zoom lens of FIG. 11 and the drive method of the rear relay lens group.
Figure 10B:
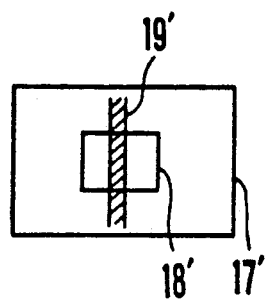
Figure 10C:
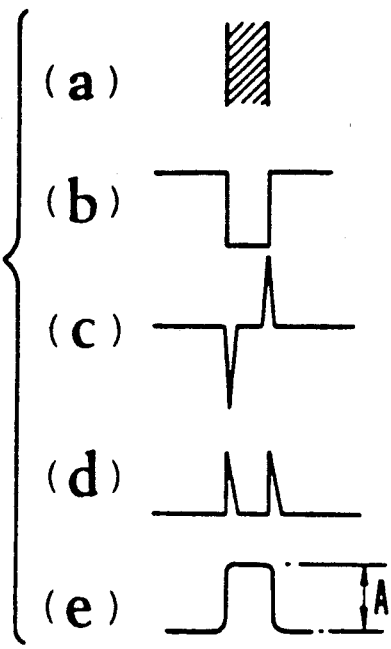
Figure 10D:
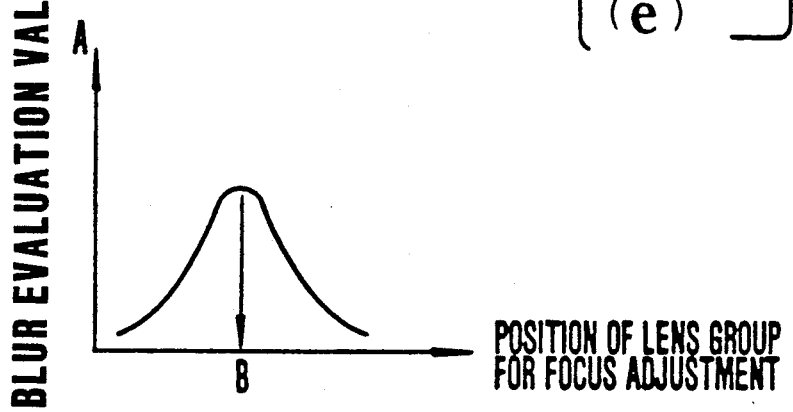

The present embodiment has a feature that a previous setting is made so that in each of the above-described divided zones as shown in FIG. 15, either one of the near focus state and the far focus state always takes place, when the lens is moved, thereby giving an advantage that the aforesaid necessity of discriminating between the near focus state and the far focus state is obviated to remove the delay due to the correction of the focusing movement. On this account, the representative speed in each of the divided zones is determined so that when zooming from the telephoto side to the wide-angle side, the near focus state, for example, always takes place as shown in FIG. 12.

Figure 17:
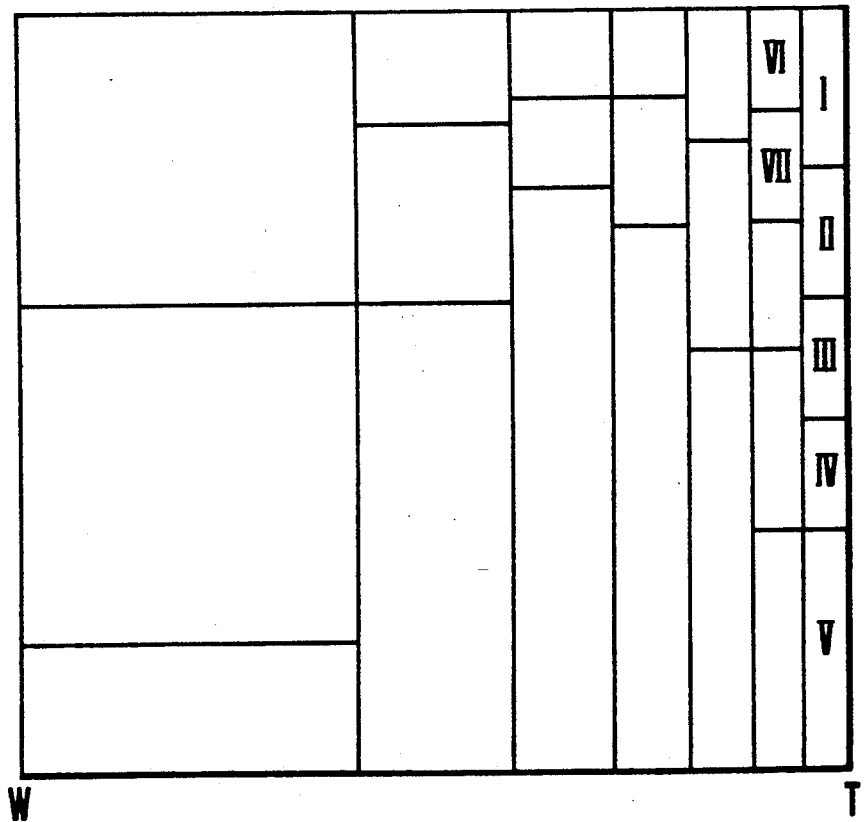
FIG. 17 is a diagram similar to FIG. 15 except that another method of dividing the map of FIG. 14 according to the principle of the invention is illustrated.

Also, FIG. 17 shows another example of zone division. In this figure, the abscissa is partitioned by taking into account the deviation of the linear approximation from the ideal locus. Therefore, in a region near or at the wide-angle side, the length of the variator moving direction becomes longer. In a case where the lens position is controlled in such a manner as described before by using this figure, it has been found from experiments that the accuracy is inferior to that in the case of using FIG. 15, but the difference is not too much large.

It has further been found that the examples of zone division of FIG. 15 and FIG. 17 even when employed in the 6 times class or standard zoom lenses has given a sufficient accuracy. Since, in general, the T→W movement of the variator is 20 mm or thereabout, the length of one zone of the variator encoder may be 1 mm even in the example of FIG. 15.

Therefore, in the present embodiment, there is a merit that as compared with the conventional example. the precision of division of, the variator encoder may be rough.

FIG. 7 shows an electrical circuit diagram of a control circuit to be combined with FIG. 11 but only different points from the first embodiment are supplemented and explained below.

The CPU 130 compares in numerical value the two items of position information with the data such as those shown in, for example, FIG. 15 and FIG. 17 stored in the zone data memory 133 to discriminate the zone in which the absolute positions in the axial direction of the V and the RR exist, then reads the representative speed of the zone which is determined by every zone from the speed data memory 131 having the representative speed data shown, for example, by symbols I, II, . . . in FIG. 15 and FIG. 17. This representative speed of the zone is set so that, in FIG. 12, with respect to the ideal locus 600' shown by the broken line in the figure in correspondence to the object distance, when the zoom actuating direction is from the telephoto side to the wide-angle side, the near focus state always occurs as shown by a reference numeral 601'. Also, as shown by a reference numeral 602', the corrected speed is set. The correcting direction of the RR in this case is such that in order to approach the ideal locus 600', it is moved always toward infinity, or to the image sensor 129.

It is to be noted that the representative speed and the corrected speed in each divided zone is set to one kind regardless of the zoom actuating direction and only the correcting direction is made reverse.

That is, when the actuating direction is from the wide-angle side to the telephoto side, the RR conversely moves so as to reach the far focus state. Therefore, the correcting direction of the RR moves always toward the minimum object distance side in order to approach the ideal locus 600'. Thus, from the zoom actuating direction, the correcting direction of the RR is unequivocally determined to permit simplification of the program, etc. to be achieved. Also, it is needless to say that in the case of zooming from the wide-angle side to the telephoto side, the representative speed of the RR may be determined so that the near focus state occurs.

Figure 13:
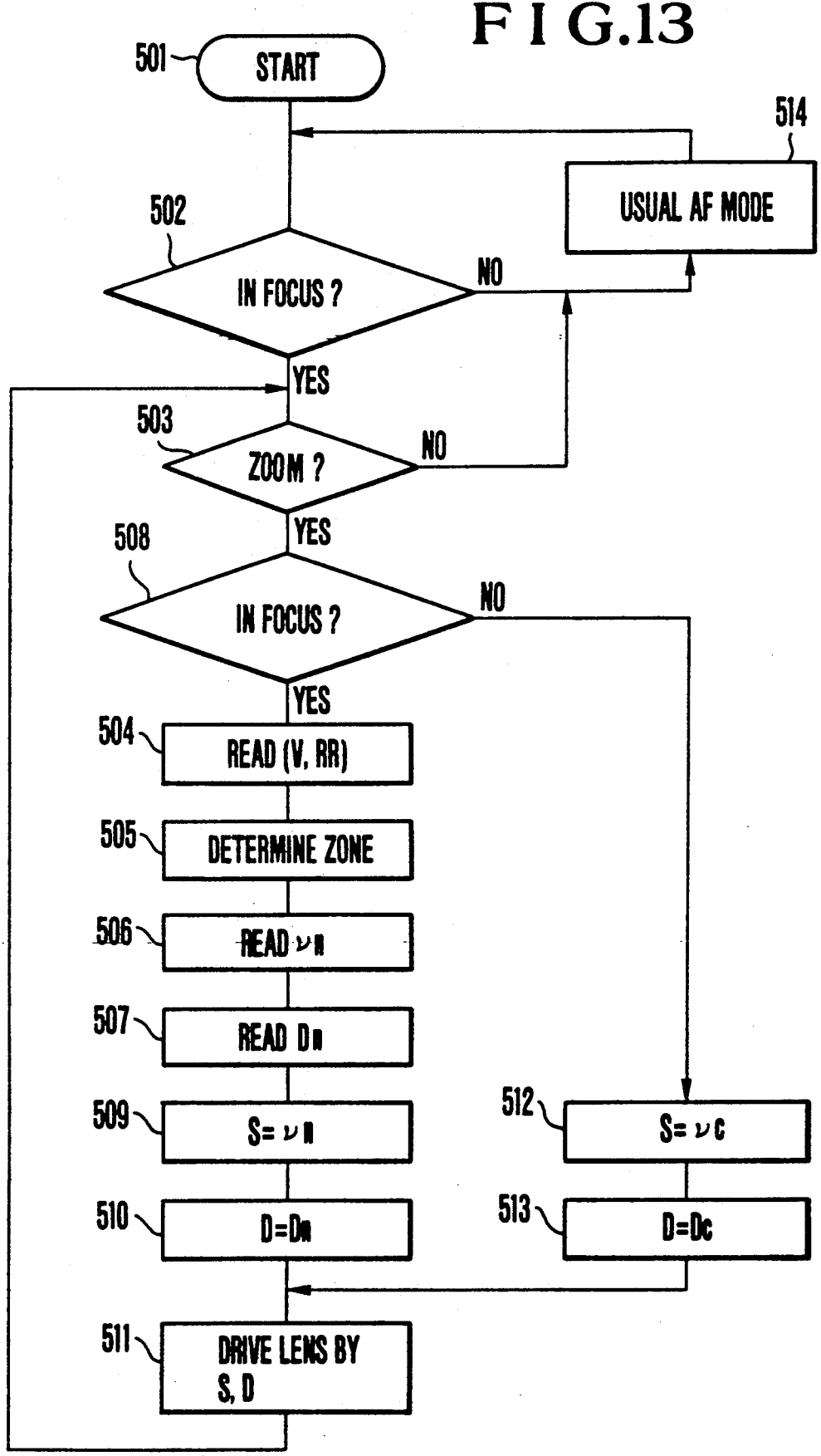
FIG. 13 is a flowchart of the second embodiment.

FIG. 13 is a flowchart for explaining a sequence of the above-described operations of the CPU 130. Incidentally, this flow is formed so as to perform one cycle in, for example, 1/60 sec..

In a step 501, the electric power source of the instrument (such as a video camera having the lens incorporated therein) is turned on. At this time, by a flow (not shown), the aforesaid resetting operation of the step motor 12 is carried out.

After that, in a step 502, whether the image is in focus or out of focus is determined by the distance measurement result. If out of focus, the AF mode of a step 514 is operated until the in-focus state is reached. For example, in FIG. 16, the RR is correctly positioned in one of the V-RR curves of FIG. 14 corresponding to the given object distance so that the position of the RR, that is, the point $P_5$, coincides with the ideal locus 23'.

In the next step 503, whether or not a zoom actuation (the actuation of the zoom switch 141) has been effected is checked. If the zoom actuation is not effected, the flow advances to a step 514 where the usual AF mode operates. Also, if the zoom is being actuated, whether the image is in focus during zooming is checked in a step 508. If the image is determined to be in focus, the flow advances to a step 504. If determined to be out of focus, the flow advances to a step 512.

In the step 504, the positions of the variator lens group 402 and the lens group (RR lens group) 404B are detected by the zoom encoder and the pulses of the step motor 12. Based on this result, the one of the zones in the map shown in FIG. 14 which the point (V, RR) belongs to is detected from the zone data memory 133 in a step 505. In a step 506, in correspondence to this zone, the representative speed of the zone which is set to the near focus state is read from the speed data memory 131, and this result is taken as $vn$. It should be noted that this representative speed of the zone may be memorized in other dimensions than mm/sec., for example, the input pulse interval. Then, whether the zoom actuating direction is from the telephoto side to the wide-angle side or from the wide-angle side to the telephoto side is read in a step 507. Then, the drive speed $S=vn$ of the RR and the zoom actuating direction $D=Dn$ are set in a step 509 and a step 510. Then, the RR is driven to move at the set speed S in the set direction D in a step 511.

Meanwhile, at a time during this zooming, if it happens that the image is determined in the step 508 to be out of focus, the drive speed S of the RR is changed from the representative speed $vn$ to the corrected speed $vc$ in a step 512. After the moving direction D of the RR is changed to the corrected direction Dc in a step 513, the RR is driven.

Since the corrected direction Dc in this case is previously set so that when in zoom actuation from the telephoto side to the wide angle-side, the near focus state always occurs, it is now set as shown by the reference numeral 602' in FIG. 12 to the infinity direction side in any zone, that is, to the image sensor 429 side of FIG. 11. Therefore, while approaching the ideal locus 600' at the corrected speed $vc$, the focusing goes on to the in-focus state.

Also, it is preferable that the corrected speed $vc$ is increased as far as possible by considering the mechanical load, etc. of the lens system from the standpoint of lessening the time loss until the in-focus state is reached.

After the focusing has been performed with the changed representative speed and the changed moving direction, the zoom actuation is started again at the step 508 and goes on in the manner of the step 504 and those that follow. When the image becomes out of focus, the aforesaid correction of the speed and moving direction of the RR is performed. Such a procedure is repeated to trace the ideal locus 600'. Thus, zooming without blurring the image can be obtained. If the critical condition such as the threshold for use in discriminating between the in-focus state and the out-of-focus state is made more rigorous, the step differences of the stepwise curve shown in FIG. 12 become smaller. Because the stepwise curve becomes more smooth, zooming while maintaining an accurate focus can be performed.

On the other hand, when the zoom actuation is from the wide-angle side to the telephoto side, the RR moves conversely so as to reach the far focus state. The driving of the RR is controlled in the same manner as in the case of the zoom actuation from the telephoto side to the wide-angle side except for the point that the corrected direction of the RR at the time when the image has been determined to be out of focus moves toward the object side.

That is, in the present embodiment, because the movement of the RR so that in the zoom actuation from the telephoto side to the wide-angle side, the near focus state occurs, while in the zoom actuation from the wide-angle side to the telephoto side, the far focus state occurs, no process of finding out the correct direction of the RR when the image is out of focus is required. Since the in-focus state can immediately be reached only by moving the RR in the corrected direction previously determined depending on the zoom actuating direction, the processing time necessary for focusing can be shortened, and the zoom actuation can be performed without causing the photographer to be aware of the production of blurring.

The Third Embodiment

Figure 19:
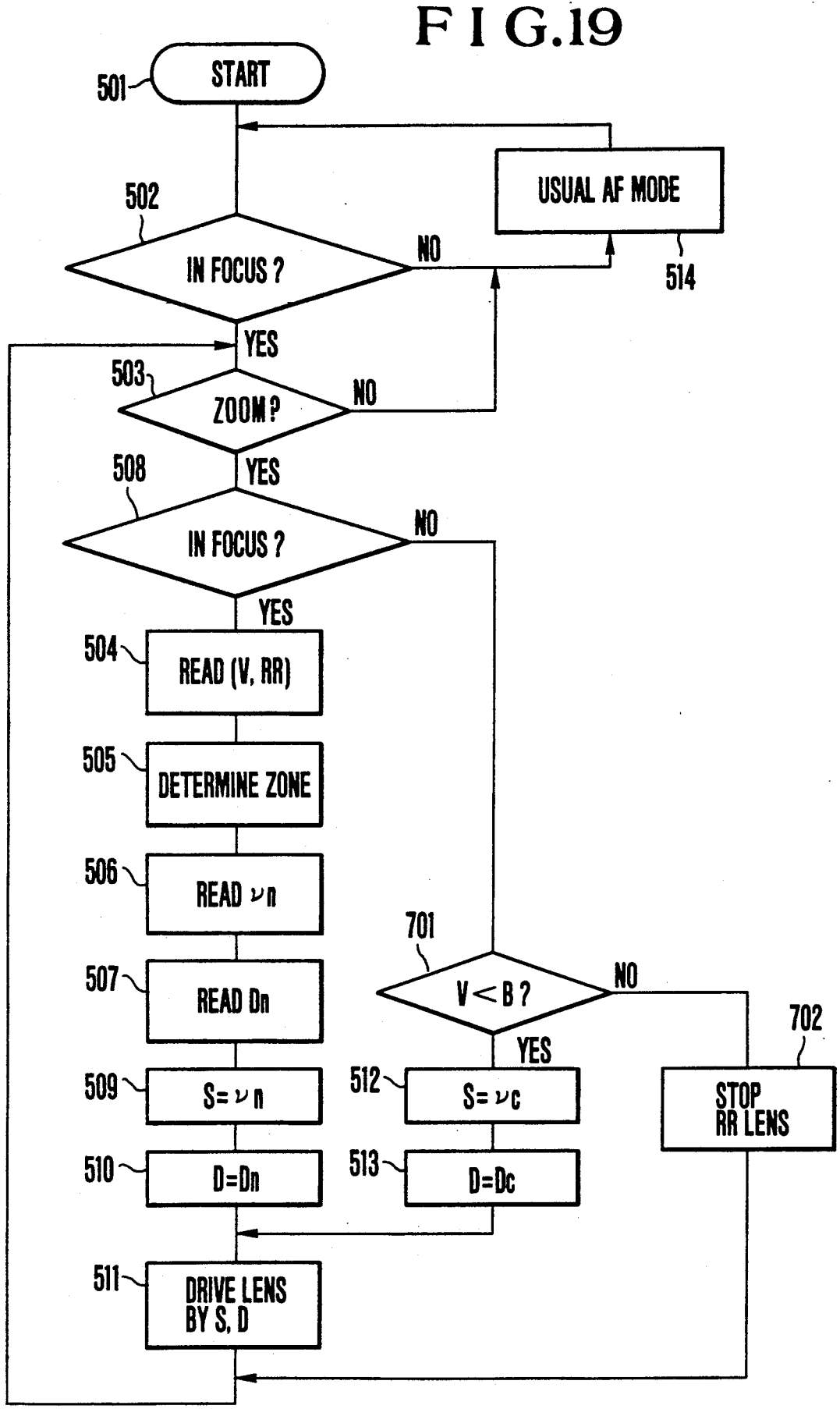
FIG. 19 is a flowchart of a third embodiment.

FIG. 19 is a flowchart illustrating the third embodiment of the invention.

Figure 21:
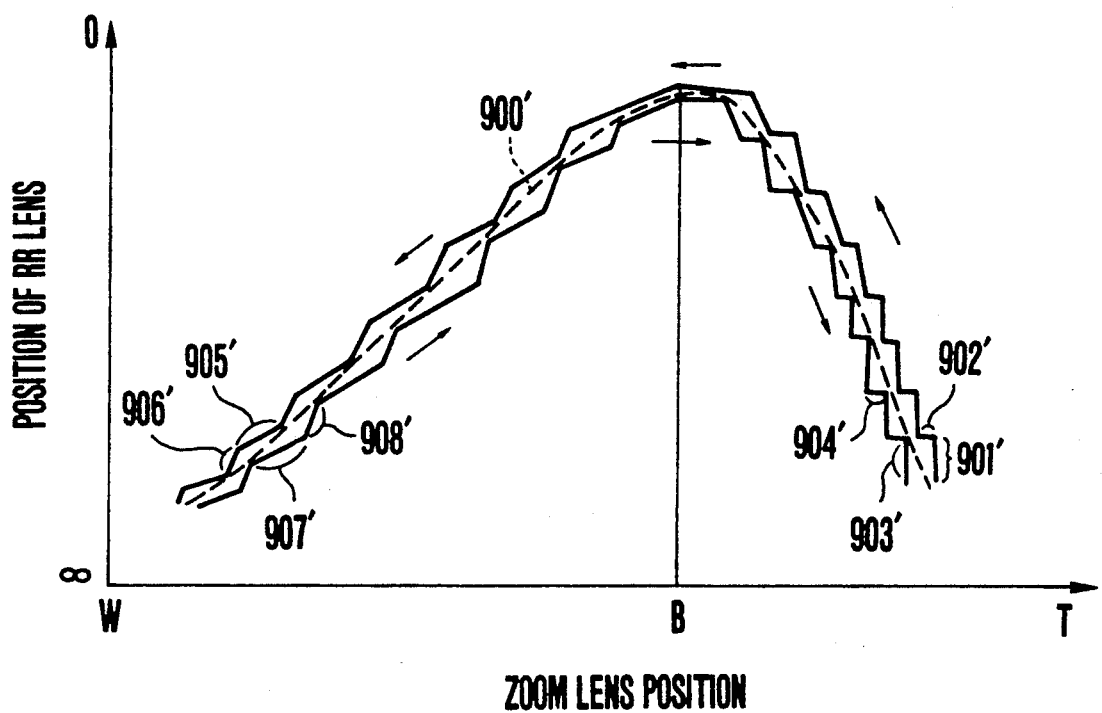
FIG. 21 is a graph illustrating a method of driving the rear relay lens (RR) group of the third embodiment.

The present invention has a feature such that in a V-RR characteristic curve shown in FIG. 21, a point B representing nearly the peak of that ideal locus 900' to the given object distance is marked. When in zooming, the correction of the RR in response to the occurrence of the out-of-focus state is made to change depending on whether the position of the V lies on the wide-angle side of the point B as the boundary or on the telephoto side. For this purpose, a step 701 and a step 702 are added to the above-described second embodiment. In the step 701, whether the position of the V lies on the wide-angle side of the point B as the boundary or the telephoto side is determined. If on the wide-angle side, likewise as in the above-described second embodiment, the step 512 and the step 513 are executed to drive the RR at the corrected speed vc in the predetermined direction Dc. If on the telephoto side, the movement of the RR is stopped in the step 702.

In FIG. 21, during zooming from the telephoto side to the wide-angle side, the RR moves with the near focus state as shown by reference numerals 901' and 905'. During zooming from the wide-angle side to the telephoto side, the RR moves with the far focus state as shown by reference numerals 907' and 903'. Here, zooming from the telephoto side to the wide-angle side, if the presence of the V on the telephoto side of the point B occurs while the image is determined to be out-of-focus, the movement of the RR is stopped (the corrected speed is zero as shown by a reference numeral 902'), because the RR is in the near focus state, so that the later movement of the V to the wide-angle side brings the image into the in-focus state. Also, similarly, when zooming from the wide-angle side to the telephoto side, if the presence of the V on the telephoto side of the point B occurs while the image is determined to be out-of-focus, the movement of the RR is stopped (the corrected speed is zero as shown by a reference numeral 903') because the RR is in the far focus state, so that the later movement of the V to the telephoto side brings the image into the in-focus state.

Meanwhile, if, on the wide-angle side of the point B, the corrected speed 906' or 908' is stopped, the V moves in the opposite direction to that in which the image is brought into focus. In this case, therefore, a similar process to that in the above-described second embodiment is carried out.

Though, in the present embodiment, when moving from the telephoto side to the wide-angle side, the RR is made to reach the near focus state, the RR may be made conversely to reach the far focus state. In this case, the critical condition in the step 701 becomes V>B. Conversely, the corrected speed of the RR on the wide-angle side of the point B is set to zero, and the correction treatment on the telephoto side is carried out in a similar manner to that in the second embodiment.

That is, in the second embodiment, the correction in the region of the telephoto side beyond the point B is performed so that the RR moves in the reverse direction to the direction that it moves for zooming. According to this third embodiment, the corrected speeds on the telephoto side of the point B are all set to zero to permit omission of the control of the corrected speed which accompanies a fine direction change, thereby giving advantages not only that the operation becomes smooth, but also that the load given to the drive motors and drive mechanisms can be lessened.

The Fourth Embodiment

Figure 20:
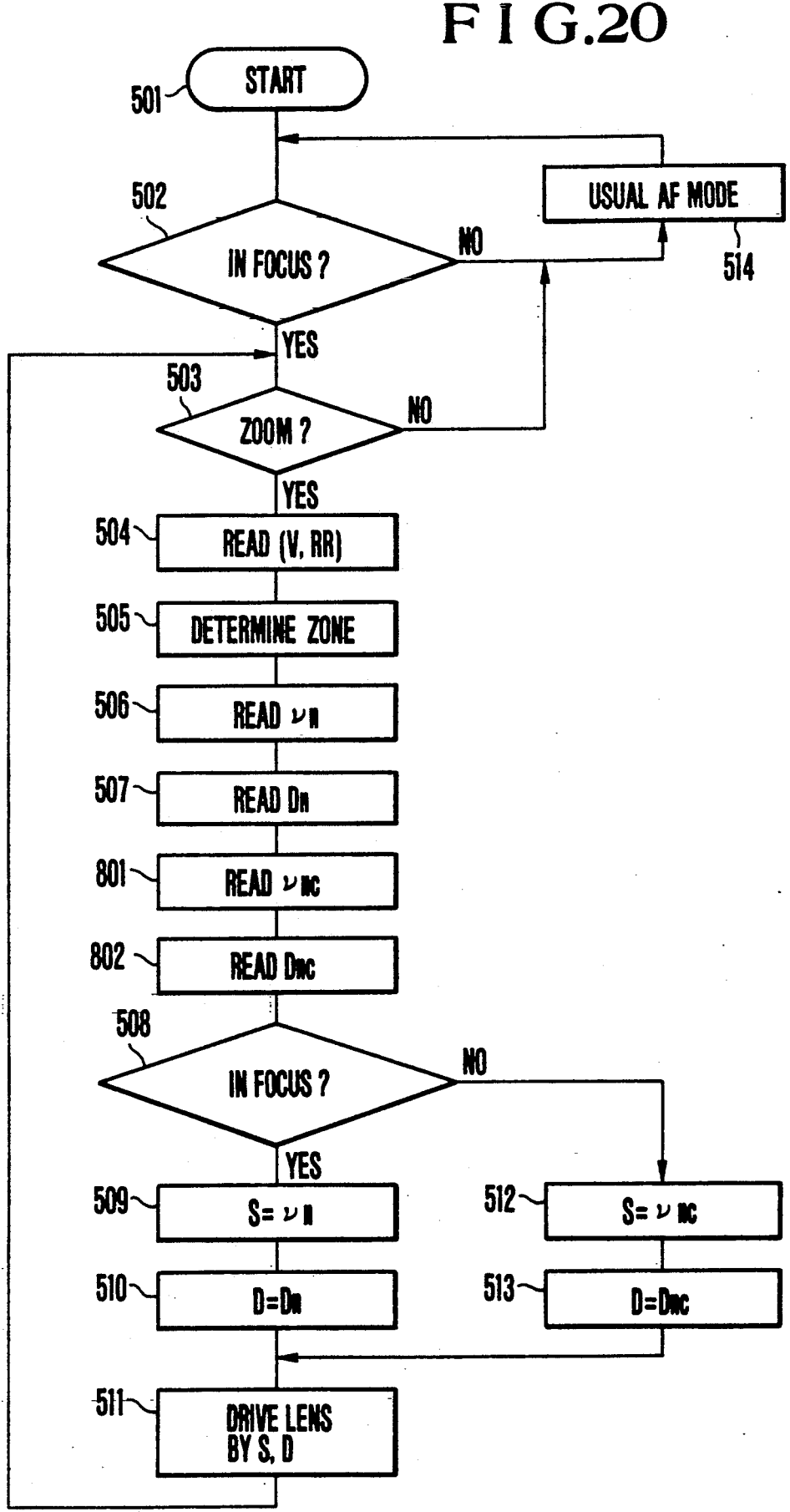
FIG. 20 is a flowchart of a fourth embodiment.

The fourth embodiment has a feature that a corrected speed vnc and a corrected direction Dnc of the RR in each divided zone are previously set, and, in a step 801 and a step 802 shown in FIG. 20, these corrected speed vnc and corrected direction Dnc are then read. Then, when the image is determined to be out of focus, the driving of the RR is controlled by the read corrected speed vnc and corrected direction Dnc.

That is, in the present embodiment, because the corrected speed and the corrected direction are set in respective individual divided zones, an optimum correction treatment can be carried out and smooth focus correction can be carried out.

Figure 18:
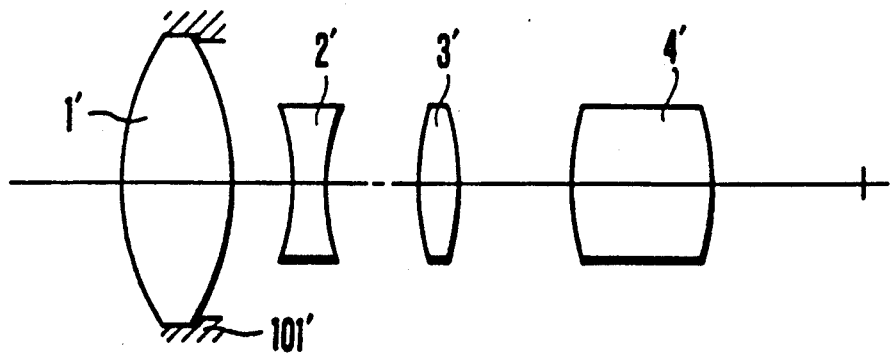
FIG. 18 is a block diagram illustrating the construction of another zoom lens.

Though each of the foregoing embodiments has been described in connection with the lens type shown in FIG. 11, the invention is applicable even to another lens type shown in FIG. 18 having four lens groups, of which the second lens group 2' has the image magnification varying function and the first lens group 1' is fixed, and the third lens group 3' has both of the compensating and focusing functions.

According to the second to fourth embodiments, by setting the representative speed of the second lens group which is used both as the compensator and the focusing lens so that an out-of-focus state, for example, a near focus state, or a far focus state, takes place, the corrected direction can unequivocally be determined to permit omission of the time necessary to discriminate the corrected direction, thereby providing advantages that the response time until the image comes in focus can be sped up and that simplification of the program becomes possible. This contributes to a reduction of the size of the electronic control circuit such as the microcomputer.

The Fifth Embodiment

Figure 22:
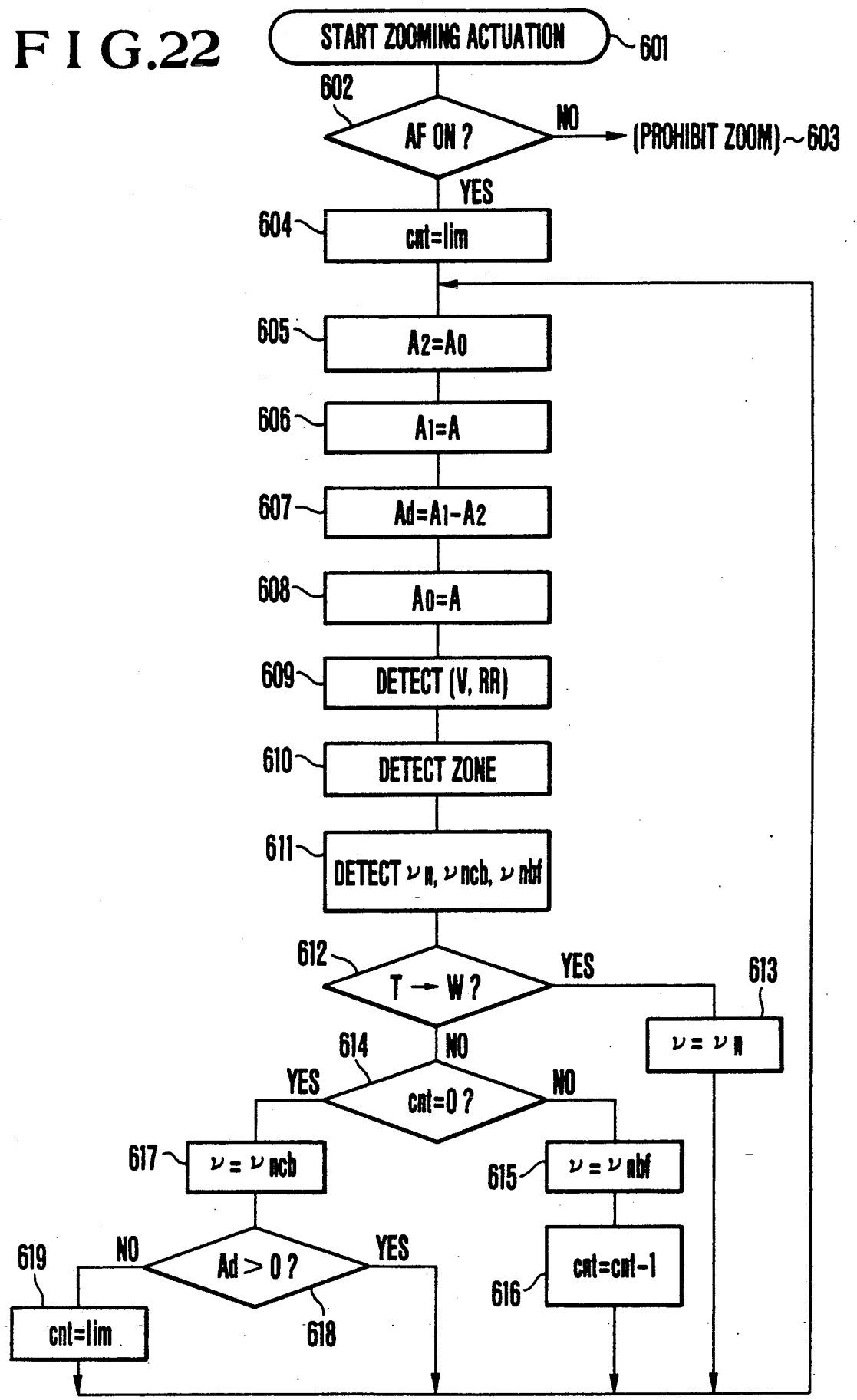
FIG. 22 is a flowchart of a fifth embodiment.

The process for controlling the driving of the lens by the CPU 130 shown in FIG. 7 is described on the basis of the flowchart shown in FIG. 22.

In a step 601, as a zoom button, etc. is actuated, a main routine begins with the start. The main routine repeats a step 605 and those that follow in, for example, 1/60 sec..

Also, when the actuation of the zoom button, etc. is interrupted, or when the variator lens group position (lens group position) reaches the terminal end of a range of movement, the main routine stops.

When the main routine enters in the step 601, whether or not the AF device (automatic focus detecting device) 135 is operative is tested in a step 602. If the AF device 135 is not operating, the magnification varying operation is prohibited in a step 603. Therefore, when the AF device is not in operation, despite actuation of the zoom button, etc. zooming does not take place. When the AF is in operation, the flow advances to a step 604.

In the step 604, a number of cycles "lim" is stored in a counter "cnt" in which is stored the number of times the main routine is to be recycled. Incidentally, the values of the "cnt" and "lim", though they will be described more fully later, are constants to be used in the W→T zooming. For example, lim=10 is set.

In the next step 605, the blur evaluation value $A_0$ of the preceding cycle is put into the register $A_2$. In this case, up to the time of the start of zoom actuation, the blur evaluation of the preceding cycle is not yet performed. The value of $A_0=0$ lies in the register $A_2$.

In a step 606, the blur evaluation value A of the present time is put into the register $A_1$.

In a step 607, $A_1$ (the present blur evaluation value) - $A_2$ (the previous blur evaluation value) is put into the register Ad.

In a step 608, A (the present blur evaluation value) is put into the register $A_0$ in order to use it as the previous blur evaluation value in the next cycle of execution of the routine.

Then, the point (V, RR) in the map of FIG. 6(A) is detected from the position (V) of the V lens group and the position (RR) of the RR lens group at the present time in a step 609.

In a step 610, the zone to which the point (V, RR) detected in the step 609 belongs is detected. In a step 611, the representative speed vn at the time of T→W zooming, for this zone, the speed vncb set so that when W→T zooming is performed, the increase of the circle of confusion produced per unit of time becomes constant, and the speed vnbf set so that the image is blurred to the far focus side, are read from the data stored for every zone.

In a step 612, whether the zoom button is pushed in the T→W direction or in the W→T direction is tested. If in the T→W direction, $v=vn$ is designated in a step 613, and the RR lens group is moved at this speed.

Meanwhile, if the zoom in the W→T direction is set, whether or not the value of the counter "cnt" is "0" is tested in a step 614. If not "0", the motor is driven at the aforesaid speed vnbf so that the lens moves always to the far focus side in a step 615.

In a step 616, the value of the counter "cnt" is decremented by one. Then, the flow returns to the step 605. If the zoom button of the W→T direction continues being depressed, this routine is repeated until the value of the counter "cnt" becomes "0". That is, if the value "lim" of the counter "cnt" has been set to, for example, "10" in the step 604, the focusing lens moves in a direction for producing the far focus state for $1/60 \times 10 = 1/6$ sec. so that a constant circle of confusion per unit time is formed.

If the initial value of the counter "cnt" is take sufficiently large within the range not exceeding the allowable diameter of circle of confusion, it becomes possible that when the counter "cnt" has become "0", the RR lens group can be set in the far focus side without failure within the blur range below the allowable circle of confusion.

If, in the step 614, the counter "cnt" is "0", the motor is rotated for now at the aforesaid speed vncb so that the lens moves to the near focus side in a step 617.

Figure 23:
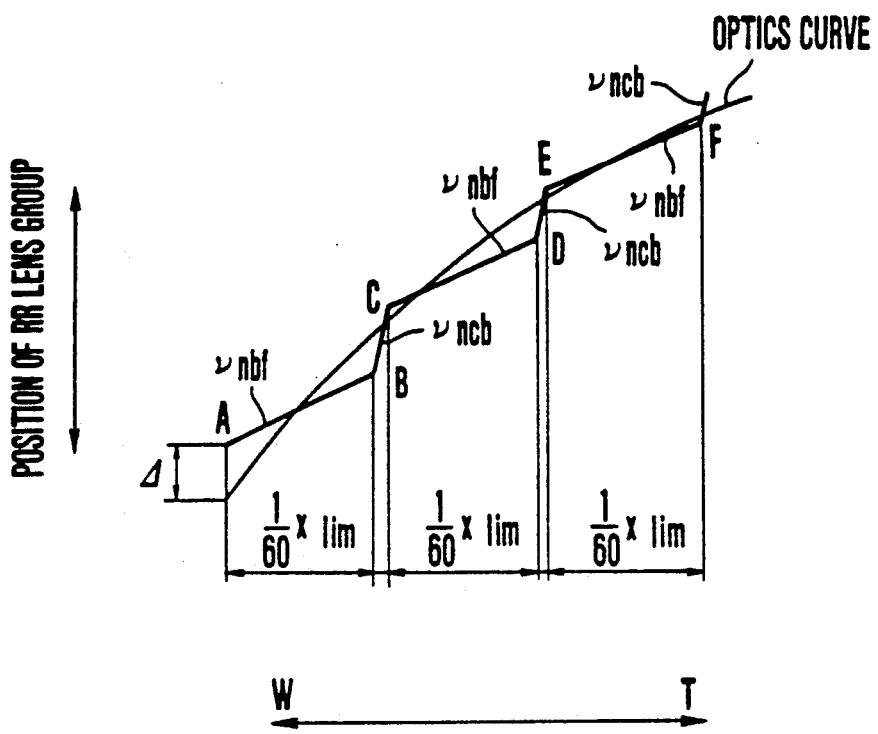
FIG. 23 is a graph illustrating the locus at the time when the RR lens group is moved.

In a step 618, whether or not the blur quantity Ad is larger than "0" is tested. If the blur quantity Ad is positive, as it implies that the focus signal A is improved over the previous cycle, and the lens goes toward the in-focus state, the flow returns directly to the step 605 so that the lens moves at the speed vncb again. If, in the step 618, the Ad becomes negative, in other words, if the best focus position is passed over and the RR lens group positions itself to a slightly near focus side, the value "lim" is inputted into the counter "cnt" in a step 619. Then, the flow returns to the step 605 and drives the RR lens group again to the far focus side. Here, the routine beginning with a step 614 is explained by using FIG. 23. On the assumption that the RR lens group on the wide-angle side has lain in a position A of defocus to the near focus side by Δ, when the W→T zoom switch is pushed down, the motor rotates at the speed vnbf so that the RR lens group moves to the far focus position B, and then at the speed vncb so that it moves to a C position. In such a manner, the focusing lens group is moved A→B→C→D→E→F, thereby it is possible suppress the blurring during the W→T zooming.

Also, if, as the RR lens group is moved in a zigzag way, the speeds vnbf and vncb are set such so that the rate of increase of the diameter of the circle of confusion per unit time is constant, it is made possible that the counter value (lim) for limiting the time of moving the lens at the speed vnbf is irrelevant to the focal length, or the depth of field.

With the arrangement described above, the blurring at the time of cnt=0 is always in the far focus state. Therefore, from time point to time point at which a blurring has occurred, whether that blurring is in the far focus state or in the near focus state is irrelevant, that is, the blurring direction is unnecessary to detect. As a result, it becomes easier to let the blurring fall always in the allowable depth.

Figure 24:
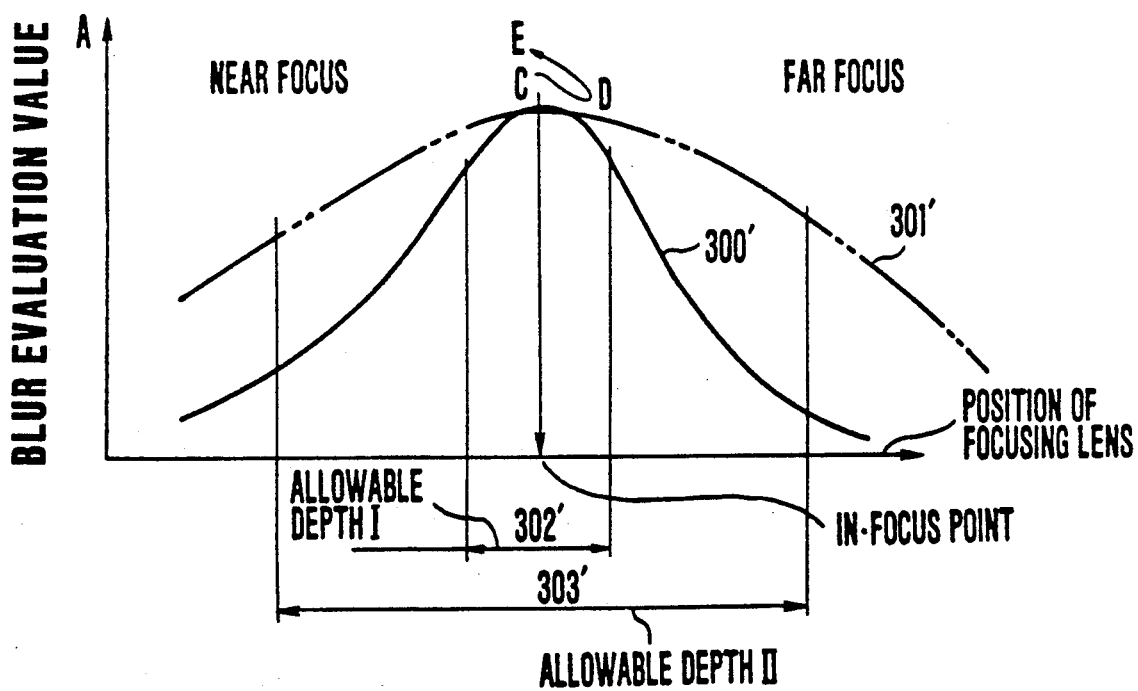
FIG. 24 is a graph illustrating the allowable depth of focus.

FIG. 24 shows on the abscissa in the position of the RR lens group and the ordinate in the blur evaluation value A representing the degree of focus obtained from the automatic focus adjusting device. If, as shown by the solid curve 300', the allowable depth I shown at 302' is within an acceptable depth, the points C, D and E of FIG. 23 become a shown in the figure.

The Sixth Embodiment

The sixth embodiment of the invention is applied to a case where the diaphragm is further stopped down, or the focal length is shortened, so that the allowable depth widens.

In FIG. 24, the characteristic curve 300' is assumed to be related to the longest focal length and the full open aperture. Then, this characteristic curve changes depending on these lens characteristics and the object situation, for example, to a double dot and dash line curve 301'. At this time, the allowable depth range is caused by the changes of the characteristics of the lens to change to an allowable depth II shown at 303'.

In the fifth embodiment described before, in determining the speed vnbf and vncb, for a given full open aperture value, for example, the changing speed of the circle of confusion determined under that condition is made constant. Therefore, if the characteristic curve changes as shown by the reference numeral 300'→301', the use of the same speed vncb and vnbf and counter "cnt" will bury the change of the value A in noise, causing the reading to be difficult, and the in-focus point to be unclear.

The present embodiment is to improve this point by making variable the value of the counter (cnt) from the aperture value F.

Figure 25:
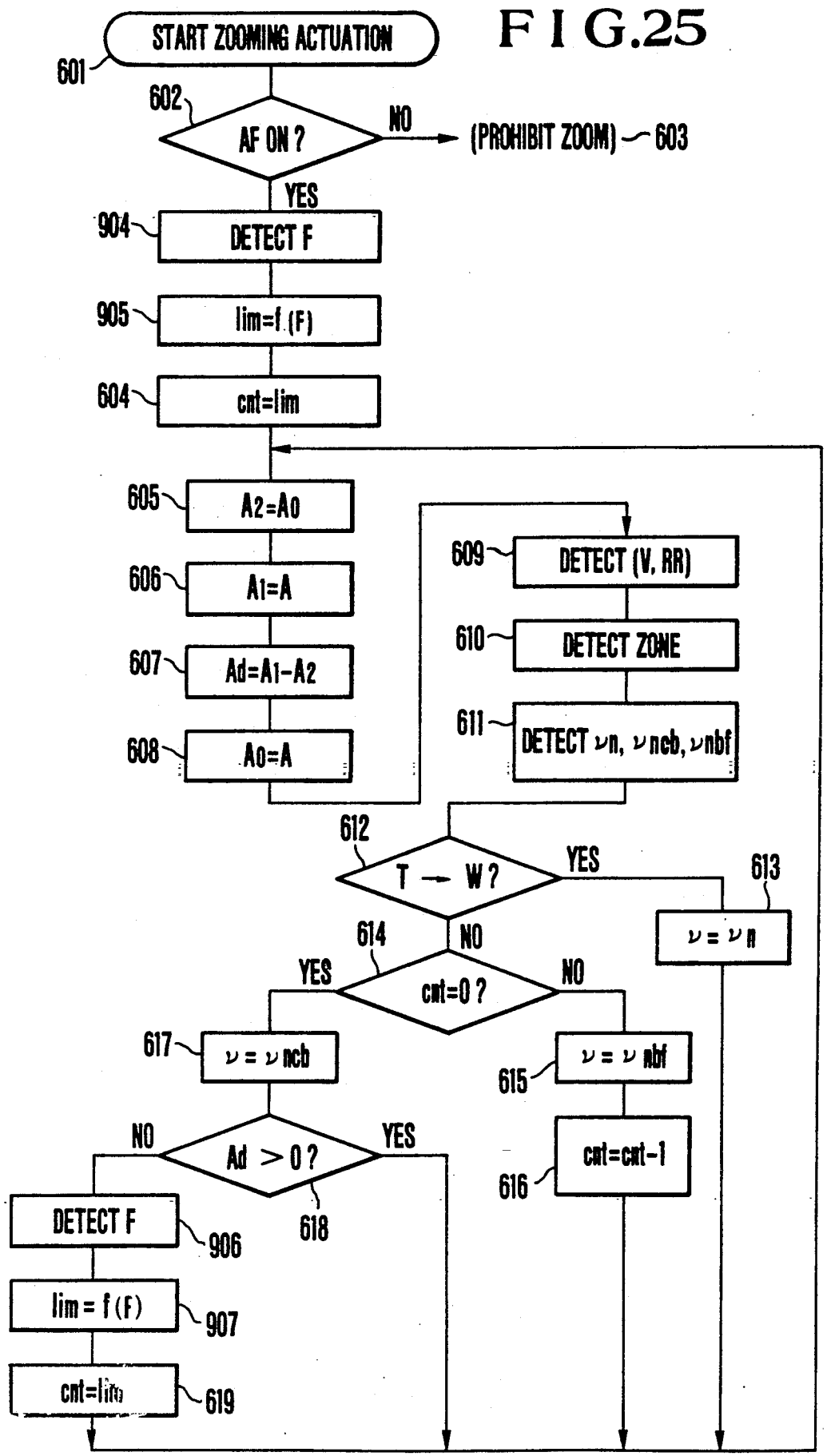
FIG. 25 is a flowchart of a sixth embodiment.

FIG. 25 is a flowchart for explaining the operation of this sixth embodiment. The same functions as those of the flowchart (FIG. 22) of the above-described fifth embodiment are labeled with the same step numbers and their explanation is omitted.

In FIG. 25, what is different from the aforesaid flowchart of FIG. 22 is that the aperture value F of the photographic lens system is detected in the preceding stage of the steps 604 and 619 of setting the value "lim" in the counter "cnt" (steps 904 and 906), and the value "lim" is computed in correspondence to this aperture value (steps 905 and 907).

It should be noted that, though in this sixth embodiment, by lim=f(F), its optimum value is computed out just before the setting of the counter value, the counter value corresponding to the aperture value F may otherwise be previously stored in a data memory.

Also, though the F value is used as the only parameter in determining the value "lim", the focal length f may be included to set the value of the counter "cnt" with a higher accuracy.

Further, the contents of the speeds νncb, νnbf may be made variable from information of the aperture value F.

Also, though in each of the above-described embodiments, after the driving using the speed νnbf, the driving is carried out at the speed νncb, this may be reversed.

As has been described above, according to the fifth and sixth embodiments, particularly when zooming from the wide-angle side to the telephoto side, the second lens group is moved first in a direction for producing a predetermined defocus, for example, to the far focus side, and then in a direction for producing a predetermined defocus to the near focus. By moving the second lens group in such a zigzag way, it has become possible to prevent the image from blurring without the necessity of a complicated mechanism.

Also, by controlling the moving speed of the second lens group by using the aperture value of the lens system, it is made possible to further reduce the degree of blur.

Though, in the embodiments, a rear relay lens group which functions both to compensate and to adjust focus has been exemplified, the invention is similarly applicable to any other types in which the relay lens is moved as a whole, or wherein both functions are performed by moving the compensator lens.

What is claimed is:

1. A lens position control device comprising:
   (a) a first lens group movable along an optical axis for performing a function of varying an image magnification;
   (b) a second lens group movable along the optical axis for performing a function of compensating at the time of variation of the image magnification and a function of focusing;
   (c) position detecting means for detecting positions of said first lens group and said second lens group;
   (d) in-focus detecting means for detecting an in-focus state; and
   (e) control means for controlling movement of said second lens group on the basis of at least position information of said first lens group and said second lens group obtained by said position detecting means and information obtained by said in-focus detecting means, said control means forcibly driving said second lens group in a deviating direction from an in-focus position.

2. A device according to claim 1, wherein said control means forcibly drives said second lens group in a deviating direction and, after that, drives said second lens group in a direction opposite to said deviating direction at least until an in-focus state is achieved.

3. A device according to claim 2, wherein said control means alternately repeats the driving of said second lens group in said deviating direction and the driving thereof in said opposite direction.

4. A device according to claim 1, wherein said control means forcibly drives said second lens group in the deviating direction and, after that, drives said second lens group in another direction.

5. A device according to claim 4, wherein said control means alternately repeats the driving of said second lens group in the deviating direction and the driving thereof in said another direction.

6. A device according to claim 1, wherein said control means varies a driving speed for the driving of said second lens group in the deviating direction according to an aperture value of a lens system.

7. A device according to claim 1, wherein said control means varies a driving speed for the driving of said second lens group in the deviating direction according to an aperture value and a focal length of a lens system.

8. A device according to claim 1, wherein said control means includes a memory for memorizing movement control information of said second lens group based on at least the position information of said first and said second lens groups.

9. A device according to claim 8, wherein said control means includes a memory for memorizing movement control information relating to the deviating direction.

10. A device according to claim 1, wherein said control means has an electric motor serving as a drive source for driving said second lens group, and controls movement of said second lens group by controlling a speed of rotation of said motor.

11. A device according to claim 1, wherein said deviating direction is a direction where focusing is effected to a farther distance than when in focus.

12. A device according to claim 1, wherein said deviating direction is a direction where focusing is effected to a nearer distance than when in focus.

13. A lens position control device comprising:
   (a) a first lens group movable along an optical axis for performing a function of varying an image magnification;
   (b) a second lens group movable along the optical axis for performing a function of compensating at the time of varying the image magnification, and a function of focusing;
   (c) position detecting means for detecting positions of said first lens group and said second lens group;
   (d) in-focus detecting means for detecting an in-focus state;
   (e) control means for controlling movement of said second lens group on the basis of at least position information of said first lens group and said second lens group obtained by said position detecting means and information obtained by said in-focus detecting means, said control means forcibly driving said second lens group in a deviating direction from an in-focus position, said control means driving said second lens group in the deviating direction when said first lens group varies the image magnification from a wide-angle side to a telephoto side.

14. A lens position control device comprising:
   (a) a first lens group movable along an optical axis for performing a function of varying an image magnification;
   (b) a second lens group movable along the optical axis for performing a function of compensating at the time of varying the image magnification, and a function of focusing;
   (c) position detecting means for detecting positions of said first lens group and said second lens group;

(d) in-focus detecting means for detecting an in-focus state;

(e) control means for controlling movement of said second lens group on the basis of at least position information of said first lens group and said second lens group obtained by said position detecting means and information obtained by said in-focus detecting means, said control means driving said second lens group in a deviating direction from an in-focus position when said first lens group varies the image magnification from a wide-angle side to a telephoto side.

* * * * *

UNITED STATES PATENT AND TRADEMARK OFFICE
CERTIFICATE OF CORRECTION

PATENT NO. : 5,005,956

DATED : April 9, 1991

INVENTOR(S) : Naoya Kaneda, et al.

It is certified that error appears in the above-identified patent and that said Letters Patent is hereby corrected as shown below:

Column 2

Line 47, "unit movement" should read --the movement of that lens is controlled based on the unit movement--.

Column 6

Line 32, "o" should read --on--.
Line 52, "register $A_2$" should read --register $A_0$--.

Column 10

Line 64, "point $P_3$" should read --point $P_3$.--.

Column 11

Line 2, "point $P_4$." should read --point $P_4$,--.

UNITED STATES PATENT AND TRADEMARK OFFICE
CERTIFICATE OF CORRECTION

PATENT NO. : 5,005,956

DATED : April 9, 1991

INVENTOR(S) : Naoya Kaneda, et al.

It is certified that error appears in the above-identified patent and that said Letters Patent is hereby corrected as shown below:

Column 11

Line 16, "of" (2nd occurrence) should be deleted.
    Line 29, "b" should read --by--.
    Line 45, "point $P_5$." should read --point $P_5$,--.

Column 12

Line 48, "much" should be deleted.
    Line 57, "example." should read --example,--.
    Line 58, "of," should read --of--.

Column 17

Line 44, "take" should read --taken--.

Column 18

Line 9, fill line to right margin.
    Line 10, "such" should be deleted.

UNITED STATES PATENT AND TRADEMARK OFFICE
CERTIFICATE OF CORRECTION

PATENT NO. : 5,005,956

DATED : April 9, 1991

INVENTOR(S) : Naoya Kaneda, et al.

It is certified that error appears in the above-identified patent and that said Letters Patent is hereby corrected as shown below:

Column 18

Line 23, "in" should be deleted.
Line 24, "in" should be deleted.

Signed and Sealed this

Twelfth Day of January, 1993

*Attest:*

DOUGLAS B. COMER

*Attesting Officer*     *Acting Commissioner of Patents and Trademarks*